(12) United States Patent
Xue et al.

(10) Patent No.: US 11,723,039 B2
(45) Date of Patent: Aug. 8, 2023

(54) DIRECTIONAL GRANT FOR SIDELINK COMMUNICATION

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Aleksandar Damnjanovic, Del Mar, CA (US); Peter Gaal, San Diego, CA (US); Juan Montojo, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/192,767

(22) Filed: Mar. 4, 2021

(65) Prior Publication Data

US 2022/0287072 A1 Sep. 8, 2022

(51) Int. Cl.
*H04W 72/23* (2023.01)
*H04W 72/02* (2009.01)
*H04W 72/0446* (2023.01)
*H04W 72/0453* (2023.01)
*H04W 72/044* (2023.01)
*H04W 76/27* (2018.01)
*H04W 80/02* (2009.01)

(52) U.S. Cl.
CPC .......... *H04W 72/23* (2023.01); *H04W 72/02* (2013.01); *H04W 72/046* (2013.01); *H04W 72/0446* (2013.01); *H04W 72/0453* (2013.01); *H04W 76/27* (2018.02); *H04W 80/02* (2013.01)

(58) Field of Classification Search
CPC . H04W 72/14; H04W 72/02; H04W 72/0446; H04W 72/0453; H04W 72/046; H04W 76/27; H04W 80/02
USPC ........................................... 370/329
See application file for complete search history.

(56) References Cited

U.S. PATENT DOCUMENTS 10,980,031 B2 * 4/2021 Schubert ............ H04W 72/082
2019/0116605 A1 * 4/2019 Luo ..................... H04B 7/15542
2019/0306912 A1 * 10/2019 Cheng .................. H04W 76/11

FOREIGN PATENT DOCUMENTS

WO    WO-2020035142 A1 * 2/2020 ........ H04W 72/0406

* cited by examiner

*Primary Examiner* — Intekhaab A Siddiquee
(74) *Attorney, Agent, or Firm* — Procopio, Cory, Hargreaves & Savitch LLP

(57) ABSTRACT

Aspects presented herein may enable a base station to configure constraints on one or more transmission directions of a UE to reduce interference between UEs. In one aspect, a UE receives, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power. The UE transmits, to the second UE, a PSSCH through at least one beam of the first subset of beams based on the received grant, or through at least one beam of the second subset of beams with the constrained transmission power based on the received grant.

30 Claims, 19 Drawing Sheets

DIRECTIONAL GRANT FOR SIDELINK COMMUNICATION

TECHNICAL FIELD

The present disclosure relates generally to communication systems, and more particularly, to sidelink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). The apparatus receives, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power. The apparatus transmits, to the second UE, a physical sidelink shared channel (PSSCH) through at least one beam of the first subset of beams based on the received grant, or through at least one beam of the second subset of beams with the constrained transmission power based on the received grant.

In an aspect of the disclosure, a method, a computer-readable medium, and an apparatus are provided for wireless communication of a base station. The apparatus determines, based on transmit directions by a first UE that reduce an interference to other UEs, one of a first subset of beams of a set of beams for a grant or a second subset of beams of the set of beams with a constrained transmission power for the grant. The apparatus transmits, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
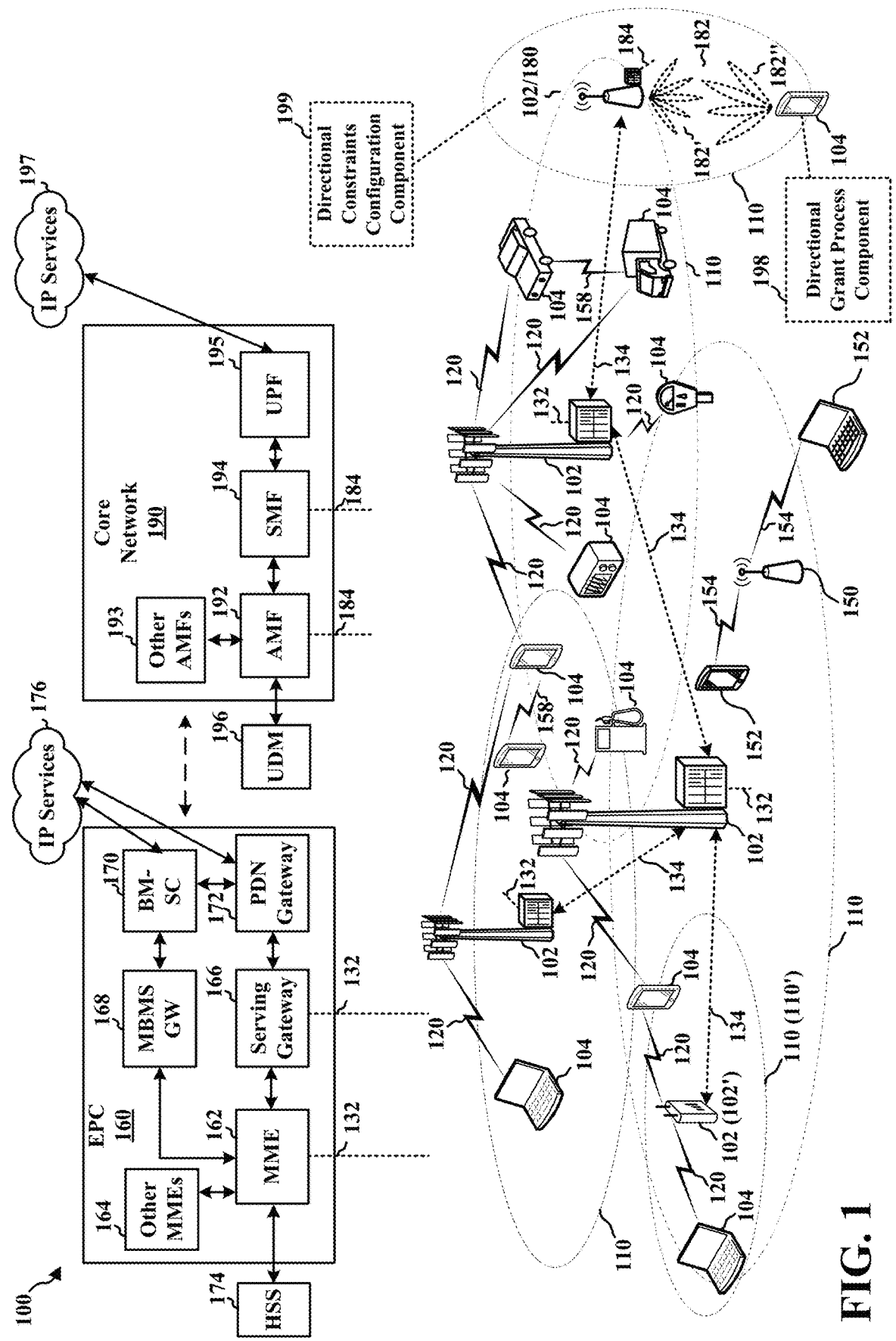
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a directional grant process component 198 configured to receive and process a grant for time and frequency resources from a base station that has constraints on one or more transmission directions of the UE. In one configuration, the directional grant process component 198 may be configured to receive, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power. In such configuration, the directional grant process component 198 may transmit, to the second UE, a PSSCH through at least one beam of the first subset of beams based on the received grant, or through at least one beam of the second subset of beams with the constrained transmission power based on the received grant.

In certain aspects, the base station 102/180 may include a directional constraints configuration component 199 configured to determine and apply constraints on one or more transmission directions of a UE to reduce interference between UEs. In one configuration, the directional constraints configuration component 199 may be configured to determine, based on transmit directions by a first UE that reduce an interference to other UEs, one of a first subset of beams of a set of beams for a grant or a second subset of beams of the set of beams with a constrained transmission power for the grant. In such configuration, the directional constraints configuration component 199 may transmit, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
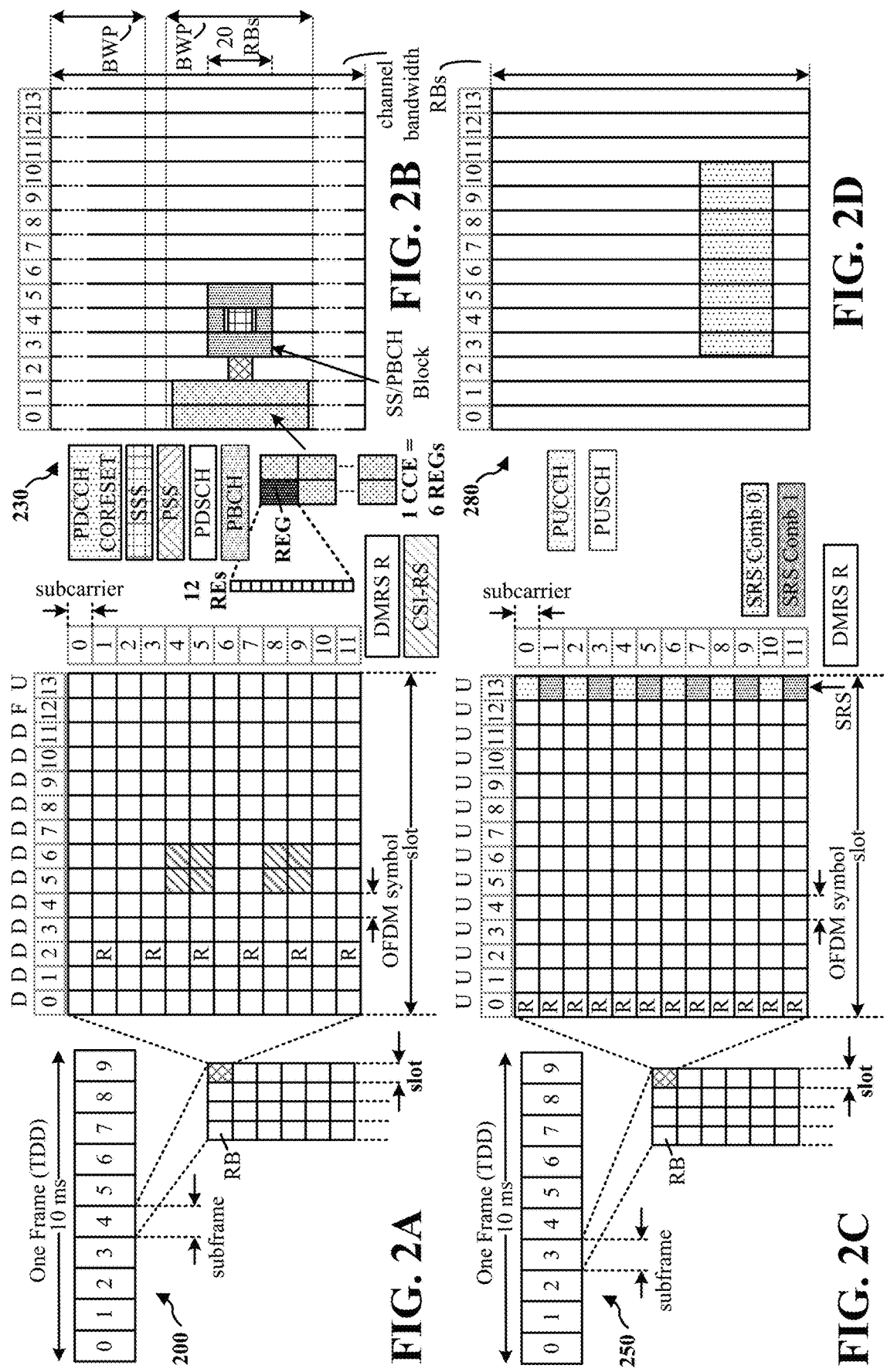
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
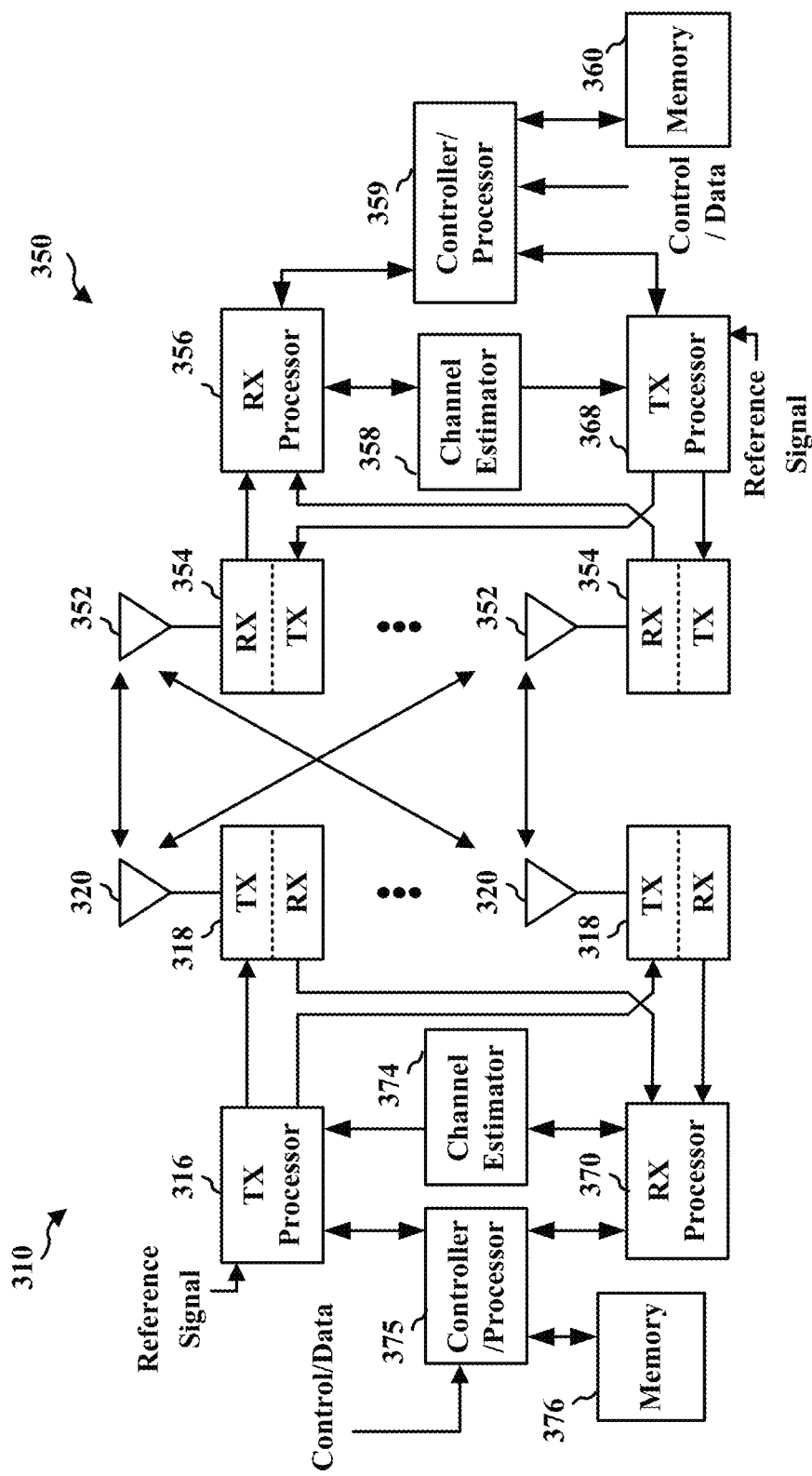
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the directional grant process component 198 of FIG. 1.

At least one of the TX processor 316, the RX processor 370, and the controller/processor 375 may be configured to perform aspects in connection with the directional constraints configuration component 199 of FIG. 1.

Referring back to FIG. 1, a link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU), etc. Sidelink communication may be exchanged using a PC5 interface.

Figure 4:
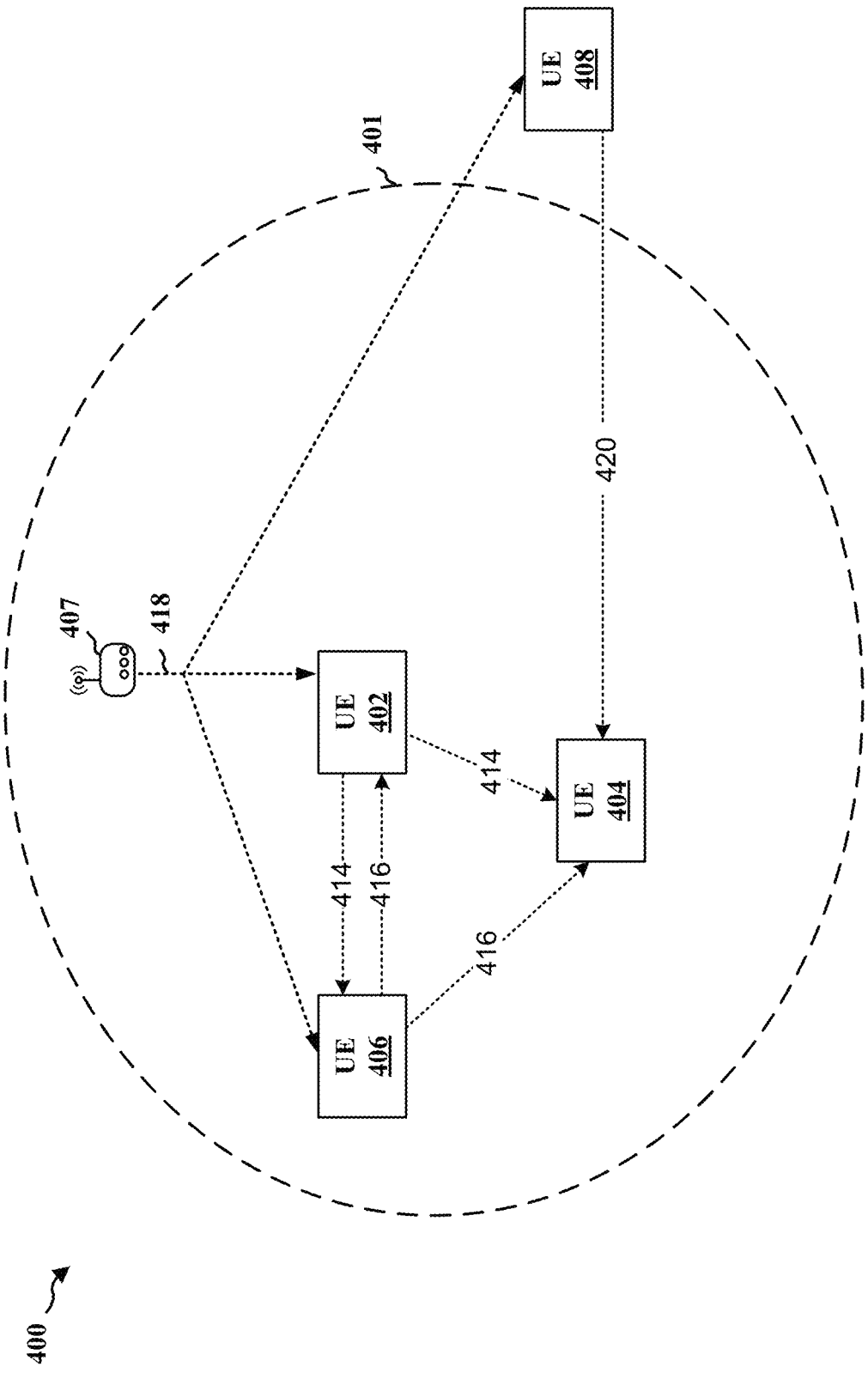
FIG. 4 is a diagram illustrating an example of wireless communication between devices based on sidelink communication.

FIG. 4 is a diagram 400 illustrating an example of wireless communication between devices based on sidelink communication. In one example, a UE 402 may transmit a transmission 414, e.g., comprising a control channel (e.g., a PSCCH) and/or a corresponding data channel (e.g., a PSSCH), that may be received by receiving UEs 404, 406. A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message (e.g., a sidelink control information (SCI) message) from a transmitting device. The UEs 402, 404, 406, 408 may each have the capability to operate as a transmitting device in addition to operating as a receiving device. Thus, UEs 406, 408 are illustrated as transmitting the transmissions 416 and 420. The transmissions 414, 416, 420 may be broadcast or multicast to nearby devices. For example, the UE 402 may transmit communication (e.g., data) for receipt by other UEs within a range 401 of the UE 402. Additionally, or alternatively, the RSU 407 may receive communication from and/or transmit communication 418 to UEs 402, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1" or "sidelink Mode 1"), centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180. In a second resource allocation mode (which may be referred to herein as "Mode 2" or "sidelink Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

Figure 5:
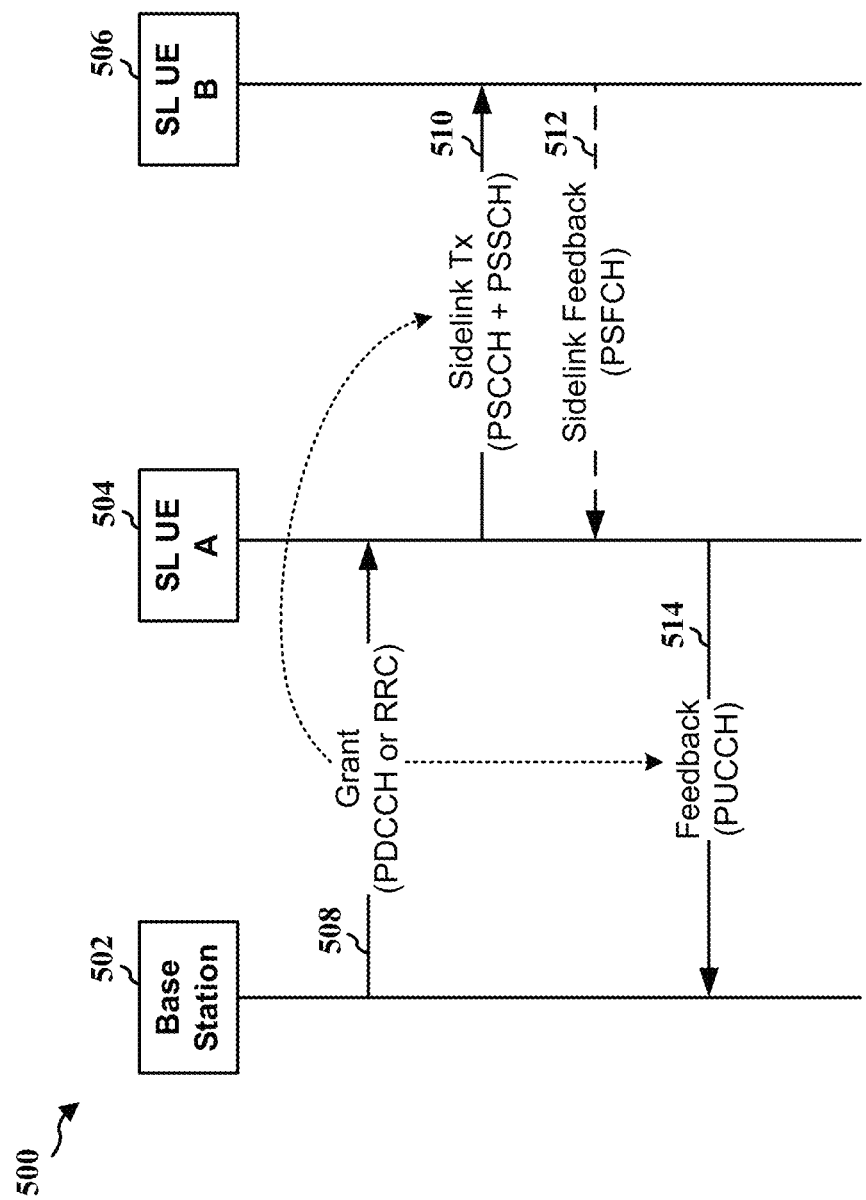
FIG. 5 is a diagram illustrating an example of a sidelink resource allocation under sidelink Mode 1.

FIG. 5 is a diagram 500 illustrating an example of a sidelink resource allocation under sidelink Mode 1. In sidelink Mode 1, as shown at 508, a first sidelink UE 504 may receive a grant for time and frequency resources from a base station 502, where the first sidelink UE 504 may use the granted time and frequency resources for communicating with other sidelink device(s). For example, at 510, the first sidelink UE 504 may transmit a sidelink transmission (e.g., a PSCCH and/or a PSSCH) to a second sidelink UE 506. At 512, the second sidelink UE 506 may optionally be configured to transmit a HARQ feedback (e.g., ACK/NACK), such as via a PSFCH, to inform the first sidelink UE 504 regarding the reception status of the sidelink transmission (e.g., whether the sidelink transmission is successfully received and/or decoded). At 514, after transmitting the sidelink transmission to the second sidelink UE 506 and optionally after receiving the HARQ feedback from the second sidelink UE 506, the first sidelink UE 504 may transmit a feedback to the base station 506, such as via a PUCCH. In one example, the first sidelink UE 504 may transmit negative feedback (e.g., a NACK) to the base station 502 to request a retransmission. In sidelink Mode 1, the base station 506 may transmit the grant for the time and frequency resources to the first sidelink UE 504 based on what the first sidelink UE 504 has reported/requested (e.g., based on its sidelink buffer status). Then, the first sidelink UE 504 may determine or identify the receiver (e.g., the second sidelink UE) and/or which modulation coding scheme (MCS) to use/apply for the sidelink transmission, etc. As such, a base station may not have as much control over a sidelink transmission compared to a transmission over a Uu link. Thus, a sidelink UE may be able to conduct a prioritized sidelink transmission adaptively according to local Quality of Service (QoS) information for the sidelink Mode 1.

When a sidelink (SL) transmitting UE is transmitting to a SL receiving UE, one or more transmission (TX) beams used by the SL transmitting UE may cause interference to communication at other sidelink UEs, such as when the SL transmitting UE is transmitting using similar time and frequency resources as the other sidelink UEs.

Figure 6:
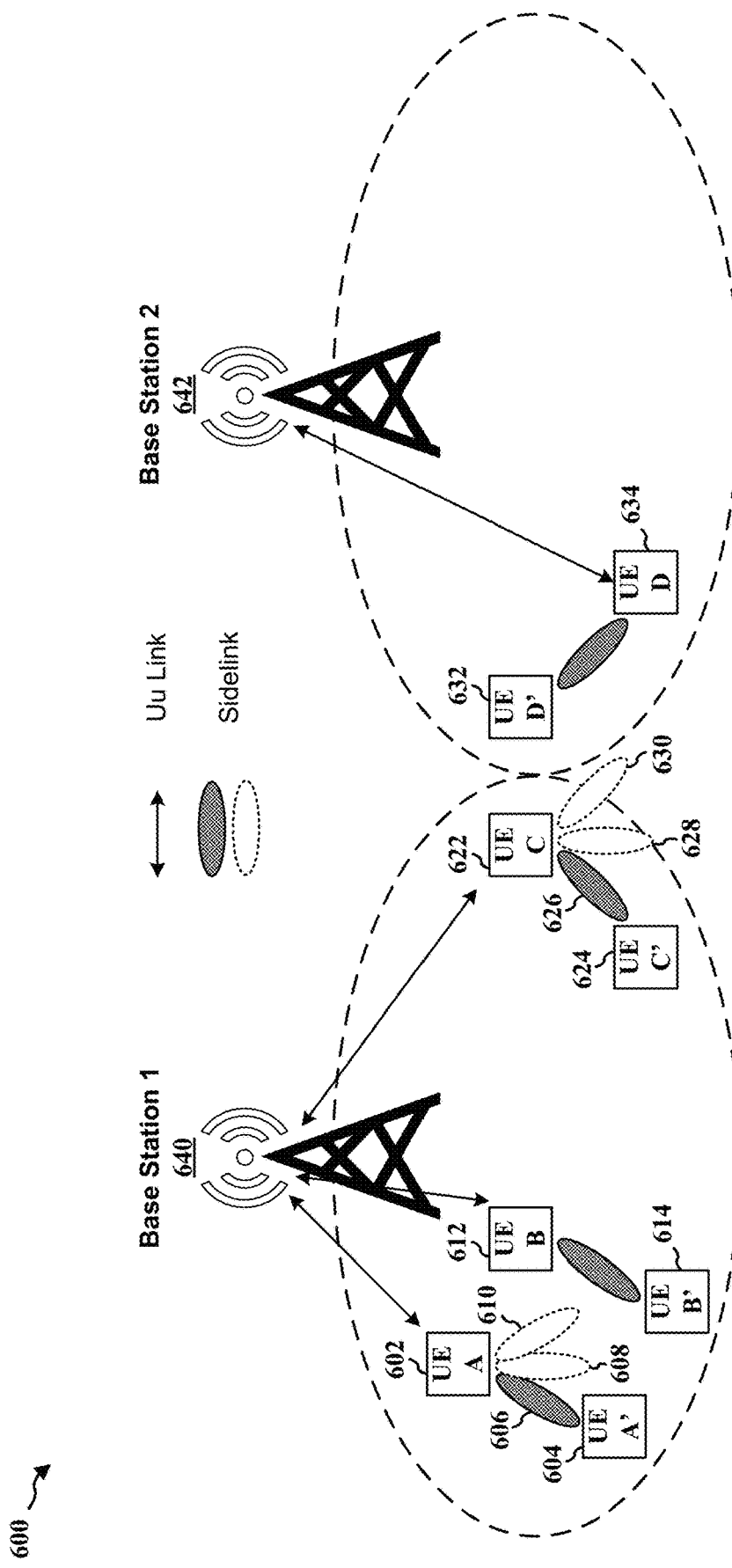
FIG. 6 is a diagram illustrating an example of sidelink interference between UEs.

FIG. 6 is a diagram 600 illustrating an example of sidelink interference between UEs. A UE 602 may be communicating with a UE 604 using one or more TX beams, such as TX beams 606, 608, and 610. A UE 612 may also be communicating with a UE 614, where the UE 612 and/or the UE 614 may be within a transmission range of the UE 602. In some examples, if the UE 602 is transmitting to the UE 604 using the TX beam 610, which may be pointing toward the UE 614, the transmission may cause interference to the communication between the UE 612 and the UE 614. In other examples, inter-base station sidelink interference may occur when multiple sidelink UEs are connected to different base stations owned by a same operator, and are communicating in multiple beam directions. For example, an operation may own both a first base station 640 and a second base station 642. A UE 622 may be communicating with a UE 624 based on a grant received from the first base station 640 and using one or more TX beams, e.g., TX beams 626, 628 and 630, and a UE 632 may also be communicating with a UE 634 based on a grant received from the second base station 642. In some examples, if the UE 622 is transmitting to the UE 624 using the TX beam 630, which may be pointing toward the UE 632 and/or the UE 634, the transmission may cause interference to the communication between the UE 632 and the UE 634 if the UE 632 and/or the UE 634 are within a transmission range of the UE 622.

Aspects presented herein may reduce interference between sidelink UEs to improve sidelink communication by enabling a base station to issue directional grants (e.g., grants with directional constraints) to one or more UEs. For instance, the base station may indicate one or more beams and/or one or more directions in a resource grant. The UE may or may not use the one or more beams, as well as may or may not transmit in the one or more directions. Aspects presented herein may enable a base station to reuse the same time and frequency resources for sidelink UEs which may be in proximity with each other (e.g., within each other's transmission range). Aspects presented herein may also enable a base station to constrain sidelink UEs (e.g., the UE 602 and the UE 612)) from using frequency-domain adjacent resources in certain directions when the sidelink UEs are close to each other, where the sidelink UEs may not be tolerant to inter-frequency resource and/or leakage, which may occur without directional transmission constraints. In some aspects, a base station may also issue a directional grant to a sidelink device (e.g., the UE 622) to avoid strong inter-base station sidelink interference to another sidelink device (e.g., the UE 632).

Figure 7:
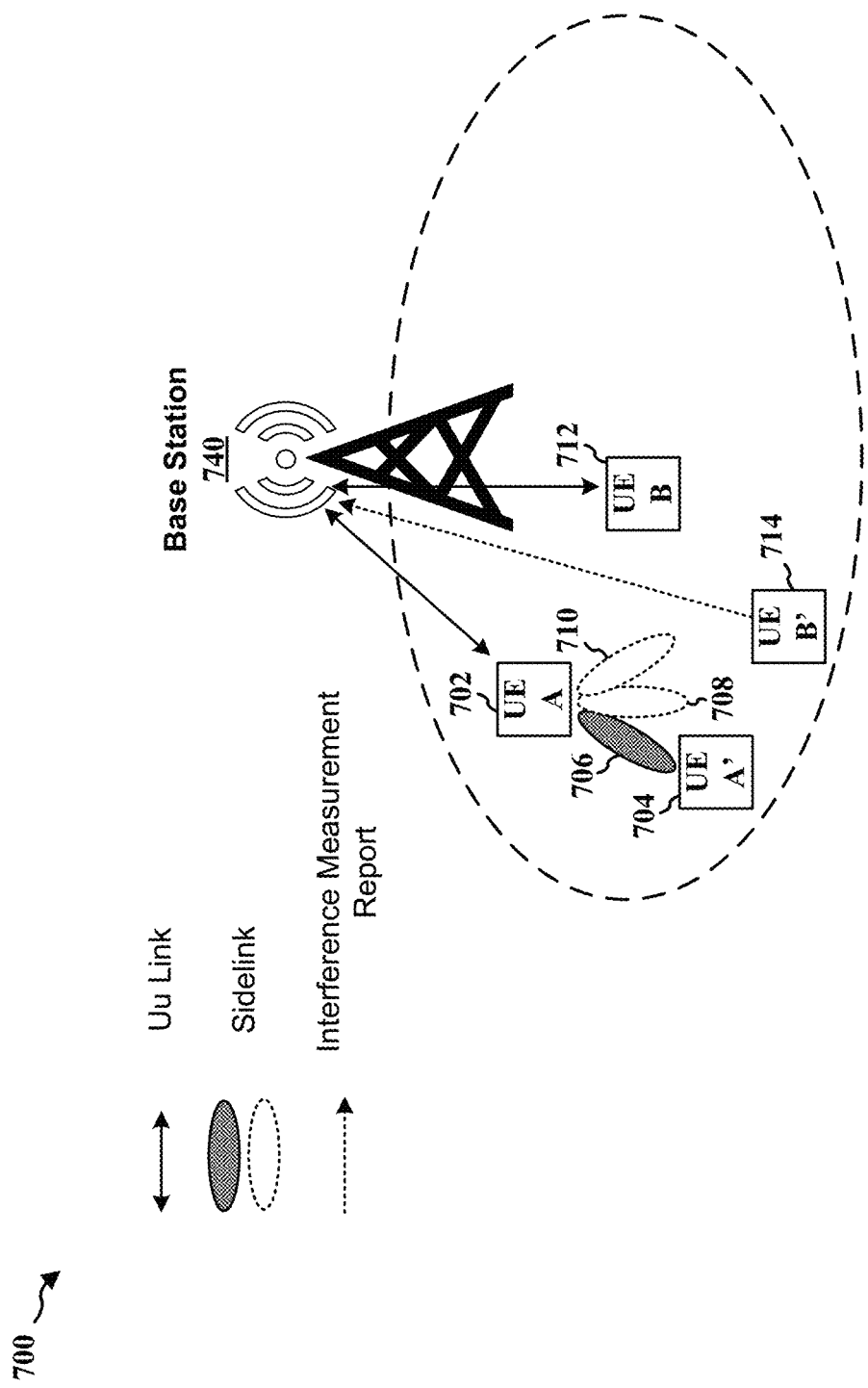
FIG. 7 is a diagram illustrating an example of a base station configuring constraints on transmission directions of a UE according to aspects of the present disclosure.

FIG. 7 is a diagram 700 illustrating an example of a base station configuring constraints on transmission directions of a UE according to aspects of the present disclosure. In one aspect, a base station 740 may decide constraints on directional TX of a UE 702 based at least in part on an interference measurement from another UE, such as a UE 714. For example, the UE 702 may be transmitting to a UE 704 using TX beams 706, 708, and 710, where the UE 714 may be a potential victim of transmission interference (e.g., the UE 714 may be within the transmission range of the UE 702). In one example, the UE 702 may have previously transmitted a PSCCH, a PSSCH, and/or SL channel state information (CSI) reference signal (RS) to the UE 704 using the TX beam 710, where the TX beam 710 may be associated with corresponding beam indices embedded in sidelink control information (SCI). If the UE 714 is listening to the TX beam 710 and identifies the TX beam 710 as a strong interferer, the UE 714 may measure the interference associated with the TX beam 710 and may send an interference measurement report to the base station 740 to indicate the interference (e.g., to identify TX beam 710 based on the beam index associated with the TX beam 710). Based upon the interference measurement report, the base station 740 may derive one or more constraints on directional transmissions for when the base station 740 will grant/schedule sidelink transmissions to the UE 702 and a UE 712 (e.g., a UE that is scheduled to transmit a transmission to the UE 714) simultaneously. For example, the base station 740 may indicate or configure the UE 702 to not use the TX beam 710 for transmission to avoid the strong interference to the UE 714, such that the UE 714 may be more likely to receive the transmission from the UE 712 successfully or with less interference.

Figure 8:
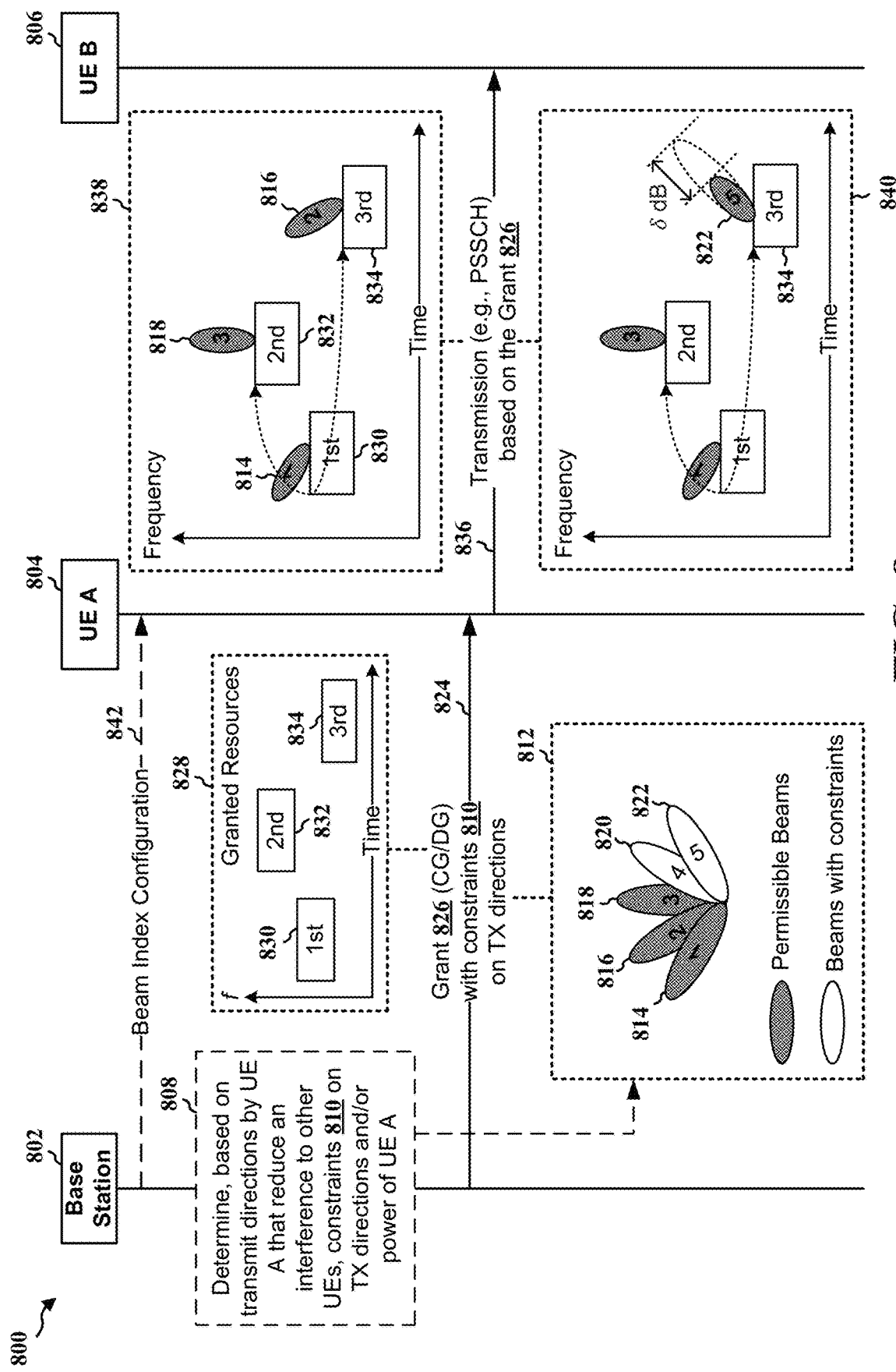
FIG. 8 is a communication flow illustrating an example of a base station configuring a grant with constraint on transmission directions to a UE according to aspects of the present disclosure.

FIG. 8 is a communication flow 800 illustrating an example of a base station configuring a grant with constraint on transmission directions to a UE according to aspects of the present disclosure. Optional aspects may be illustrated with a dashed line. In one aspect, as shown at 808, based at least in part on transmission directions of a transmitting UE 804, which may be operating under sidelink Mode 1, a base station 802 may determine to apply constraints 810 on one or more beams of the transmitting UE 804 and/or on one or more transmitting directions of the transmitting UE 804. For example, as shown at 812, the transmitting UE 804 may have five (5) TX beams 814, 816, 818, 820, and 822, which may be transmitting (e.g., pointing) in different directions. If the base station 802 determines that transmissions from TX beams 820 and 822 of the transmitting UE 804 may cause interference to other UE(s), the base station 802 may apply constraints 810 on the TX beams 820 and 822. Details about how base station 802 may make such determination is discussed in details below. In one example, the constraints 810 may inform or configure the transmitting UE 804 to not use the TX beams 820 and 822 for transmission (e.g., which may be referred to as a "hard constraint" for purposes of the present disclosure). In another example, the constraints 810 may inform or configure the transmitting UE 804 to reduce a transmission power or to transmit with a back-off power when the transmitting UE 804 is transmitting using the TX beams 820 and 822 (e.g., which may be referred to as a "soft constraint" for purposes of the present disclosure).

At 826, after determining the constraints 810, the base station 802 may transmit a grant 826 for time-frequency resources in which the transmitting UE 804 may use for transmitting to another UE, where the grant may be a dynamic grant (DG) or a configured grant (CG). For example, as shown at 828, the grant 826 may include time and frequency resources 830, 832, and 834. In addition, the grant 826 may include information related to the constraint 810. For example, the grant 826 may indicate to the transmitting UE 804 that the transmitting UE 804 may not use its TX beams 820 and 822 on the granted time and frequency resources (e.g., 830, 832, 834), or to transmit on the TX beams 820 and 822 with a reduced or backed-off power. In another example, as an alternative, the grant 826 may indicate to the transmitting UE 804 that the transmitting UE 804 may use its TX beams 814, 816, and 818 on the granted time and frequency resources. As such, the transmitting UE 804 may be prevented from using one or more TX beams indicated in the grant 826.

In one example, each TX beam of the transmitting UE 804 may be associated with a beam index, such as an interference measurement beam index. The beam index may be configured for the transmitting UE 804 by the base station 802, such as via a beam index configuration, as shown at 842. As such, the base station 802 may indicate the constraints 810 to the transmitting UE 804 based on the beam index. For example, the TX beam 820 may be configured to be associated with a beam index #4 and the TX beam 822 may be configured to be associated with a beam index #5. Thus, the base station 802 may inform the transmitting UE 804 about the constraints 810, such as TX beams in which the transmitting UE 804 may not use on the granted resources, by using the associated beam index, e.g., by indicating beam indices #4 and #5 to the transmitting UE in the grant 826. In one example, the base station 802 may transmit a configuration (e.g., the beam index configuration) for the beam index via RRC signaling and/or a MAC-CE, such as for a DG.

At 836, the transmitting UE 804 may transmit a PSCCH and/or a PSSCH to a receiving UE 806 using the granted resource and based on the constraints 810. For example, as shown at 838, the transmitting UE 804 may transmit first data from the TX beam 814 to the receiving UE 806 using the granted resource 830, the transmitting UE 804 may transmit second data from the TX beam 818 to the receiving UE 806 using the granted resource 832, and the transmitting UE 804 may transmit third data from the TX beam 816 to the receiving UE 806 using the granted resource 834, etc. If the constraints 810 are configured to be hard constraints, the transmitting UE 804 may not use TX beams 820 and 822 for transmissions. However, if the constraints 810 are configured to be soft constraints, the transmitting UE 804 may use TX beams 820 and 822 for transmissions, but the transmission power may be reduced, such as by a δ dB back-off amount. For example, as shown at 840, the transmitting UE 804 may transmit the third data from the TX beam 822 to the receiving UE 806 using the granted resource 834, but the transmission power may be reduced by δ dB (e.g., 5 dB, 10 dB, etc.). In one example, the base station 802 may configure the δ dB back-off for the transmitting UE 804, such as via a system information block (SIB), RRC signaling, and/or a MAC-CE. As such, based on the grant 826, the transmitting UE 804 may select which UE to transmit and/or which MCS to use as long as the constraints 810 (e.g., the transmission directional constraints) are met by the transmitting UE 804.

In one aspect of the present disclosure, the transmission directional constraint (e.g., the constraints 810) may be specified as a set of forbidden sidelink (SL) channel state information (CSI) reference signal (RS) resource index (SL-CRI), where the beam index (e.g., the interference measurement beam index) may be defined based on the SL-CRI associated with each TX beam of the transmitting UE 804. This may provide the base station 802 with more freedom in configuring the beam index for the transmitting UE 804. In other words, SL-CRI may be defined as an index (one-to-one) mapped to a directional SL-CSI-RS, and the base station 802 may indicate to the transmitting UE 804 which beam(s) the transmitting UE 804 may use for transmission and/or which beam(s) the transmitting UE 804 may not use for transmission based on the SL-CRI(s) associated with the TX beams. In such configurations, the transmitting UE 804 may be configured to conduct directional transmissions being quasi-co-located (QCLed) to one of the allowed SL-CRIs (e.g., corresponding to permissible TX beams).

Figure 9:
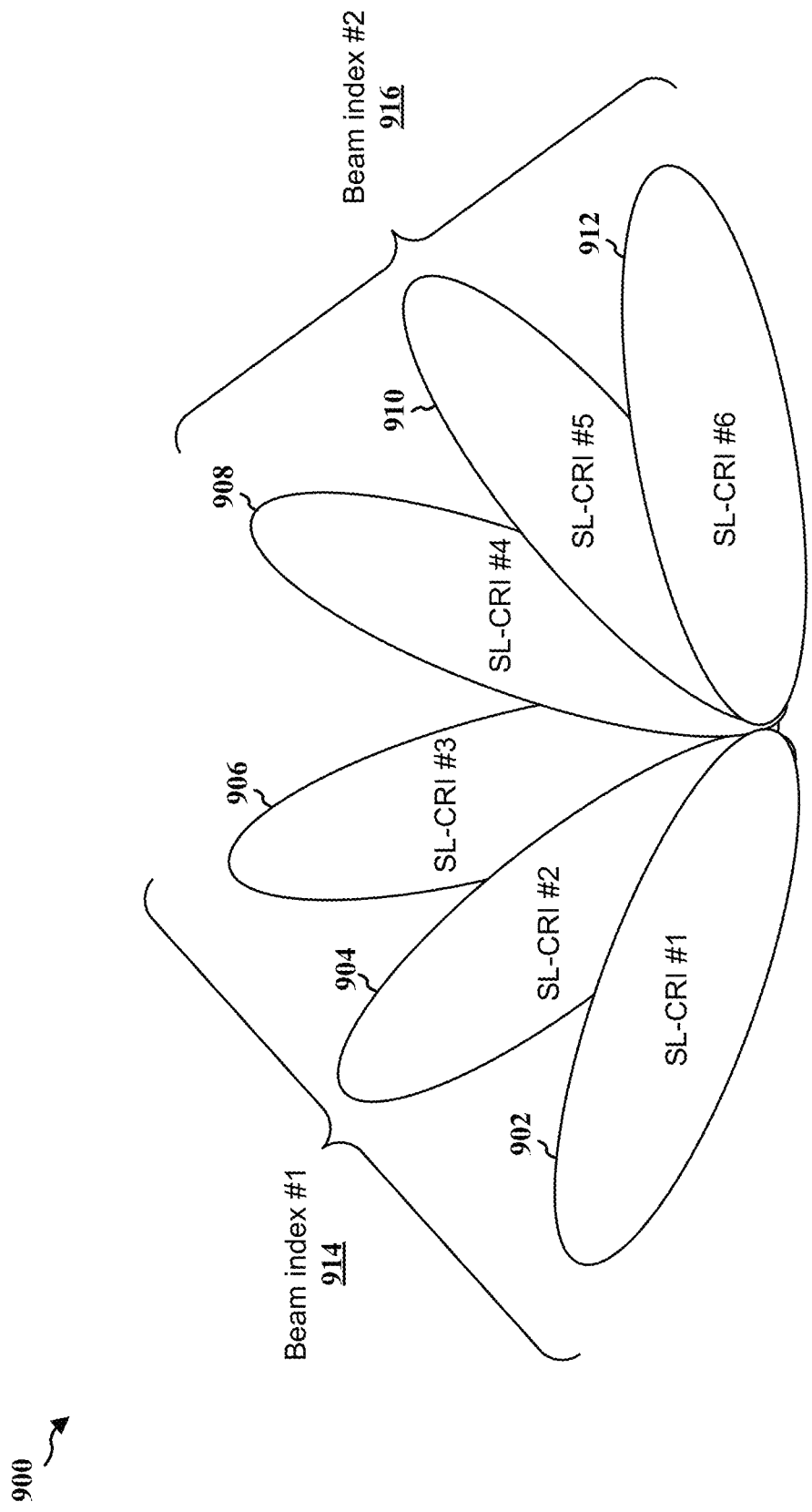
FIG. 9 is a diagram illustrating an example of a many-to-one mapping beam index based on SL-CRI according to aspects of the present disclosure.

In another aspect of the present disclosure, to conserve transmission overhead, the transmitting UE 804 may use a many-to-one mapping between SL-CRIs and the beam index (e.g., the interference measurement beam index) to simplify the interference measurement procedure and to reduce the size of an interference measurement report (discussed below). FIG. 9 is a diagram 900 illustrating an example of a many-to-one mapping beam index based on SL-CRI according to aspects of the present disclosure. In one example, a transmitting UE (e.g., the transmitting UE 804) may have six (6) TX beams 902, 904, 906, 908, 910, and 912 that are associated with SL-CRI #1, #2, #3, #4, #5, and #6 respectively, where TX beams 902, 904, and 906 (e.g., SL-CRI {1,2,3}) may be configured to be mapped to a first beam index 914, and TX beams 908, 910, and 912 (e.g., SL-CRI {4,5,6}) may be configured to be mapped to a second beam index 916. As such, a base station (e.g., the base station 802) may apply directional constraints (e.g., the constraints 810) on multiple TX beams of the transmitting UE using one beam index. For example, if the base station determines to apply directional constraints on one or more beams within the TX beams 908, 910, and 912 of the transmitting UE, the base station may indicate the second beam index 916 to the transmitting UE instead of indicating the TX beams 908, 910, and/or 912 separately. This may simplify the interference measurement procedure and reduce the size of the constraint indication (e.g., the constraints 810 and the size of the grant 826).

In another aspect of the present disclosure, referring back to FIG. 8, for the base station 802 to determine whether to apply constraints 810 on transmission directions and/or beams of the transmitting UE 804, such as shown at 808, the determination may be based on one or more interference measurements performed by other sidelink UE(s).

Figure 10:
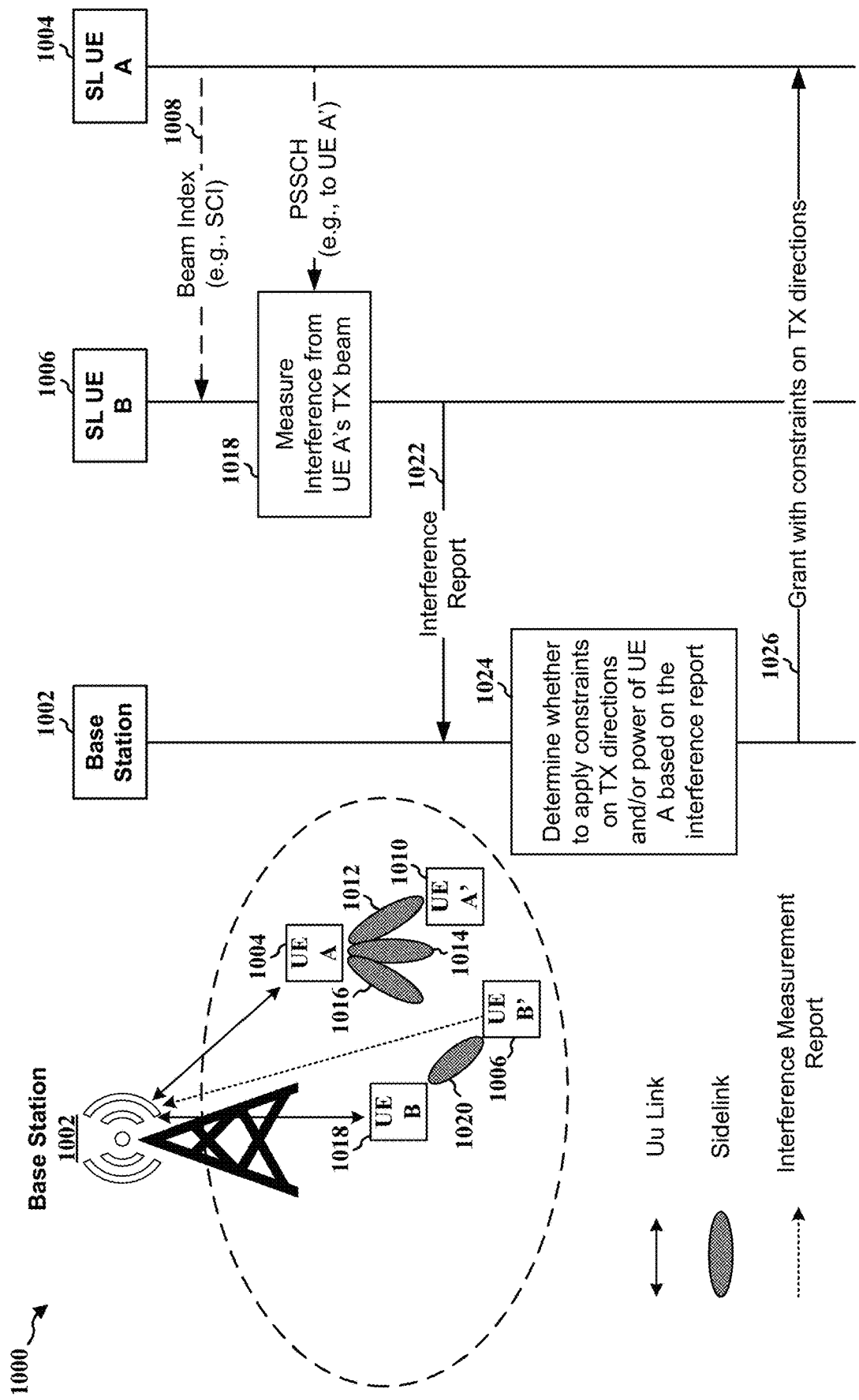
FIG. 10 is a diagram illustrating an example of a base station determining directional constraints for a UE based on an interference measurement report according to aspects of the present disclosure.

FIG. 10 is a diagram 1000 illustrating an example of a base station determining directional constraints for a UE based on an interference measurement report according to aspects of the present disclosure. In one aspect of the present disclosure, as shown at 1008, to facilitate interference measurement with regard to directional sidelink transmissions, a first UE 1006 (e.g., the transmitting UE 804) may include its beam index used for transmitting a PSSCH in the corresponding SCI, such as the interference measurement beam index that is described in connection with FIGS. 8 and 9. For example, the first UE 1006 may be using three TX beams 1012, 1014, and 1016 for communicating with another UE, such as a peer UE 1010. Prior to transmitting a PSSCH to the UE 1010, the first UE 1004 may transmit (e.g., broadcast) its beam index that is associated with the TX beams 1012, 1014, and 1016 to nearby UEs, which may include a second UE 1006.

At 1018, when the first UE 1004 is transmitting the PSSCH to the UE 1010 using one or more of the TX beams 1012, 1014, and 1016, the second UE 1006 may measure the interference (e.g., the received power) from the one or more of the TX beams 1012, 1014, and 1016, and the second UE 1006 may link the measured interference with the beam index received from the first UE 1004. In one example, when conducting the interference measurement, the second UE 1006 may apply a receiving beam 1020 that is tuned to a peer transmitting UE 1018. Then, the second UE 1006 may be configured to record a set of strong interfering beams (either co-channel or frequency domain leakage) when the measured interference is larger than a configured interference threshold.

At 1022, the second UE 1006 may include the set of strong interfering beams with measured interference larger than the configured interference threshold in an interference report, and the second UE 1006 may transmit the interference report to a base station 1002. In one example, the interference report may include an ID of the first UE 1004 (e.g., UE ID), the beam index associated with strong interfering beam(s), and optionally an ID of its peer transmitting UE 1018 (e.g., UE ID). For example, the second UE 1006 may measure and determine that the interference coming from the TX beams 1014 and 1016 of the first UE 1004 is above the interference threshold, and may generate an interference report that includes at least the UE ID of the first UE 1004, beam indices associated with the TX beams 1014 and 1016, and optionally the UE ID of the transmitting UE 1018.

At 1024, based on the received interference report, the base station 1002 may determine whether to apply constraints on TX directions and/or power of the first UE 1004, such as described in connection with 808 of FIG. 8. For example, if the base station 1002 determines to apply constraints on TX directions and/or power of the first UE 1004, then at 1026, the base station 1002 may transmit a grant (e.g., the grant 826) to the first UE 1004 that includes the constraints, such as described in connection with 824 of FIG. 8. As such, the base station 1002 may determine whether to apply directional constraints for a UE based on one or more interference measurement reports received from other UEs. In one example, the beam index in SCI may enable interference measurement averaging over multiple sidelink transmissions that carries the same beam index, which may provide the base station 1002 with sufficient dynamics on a DG.

Figure 11:
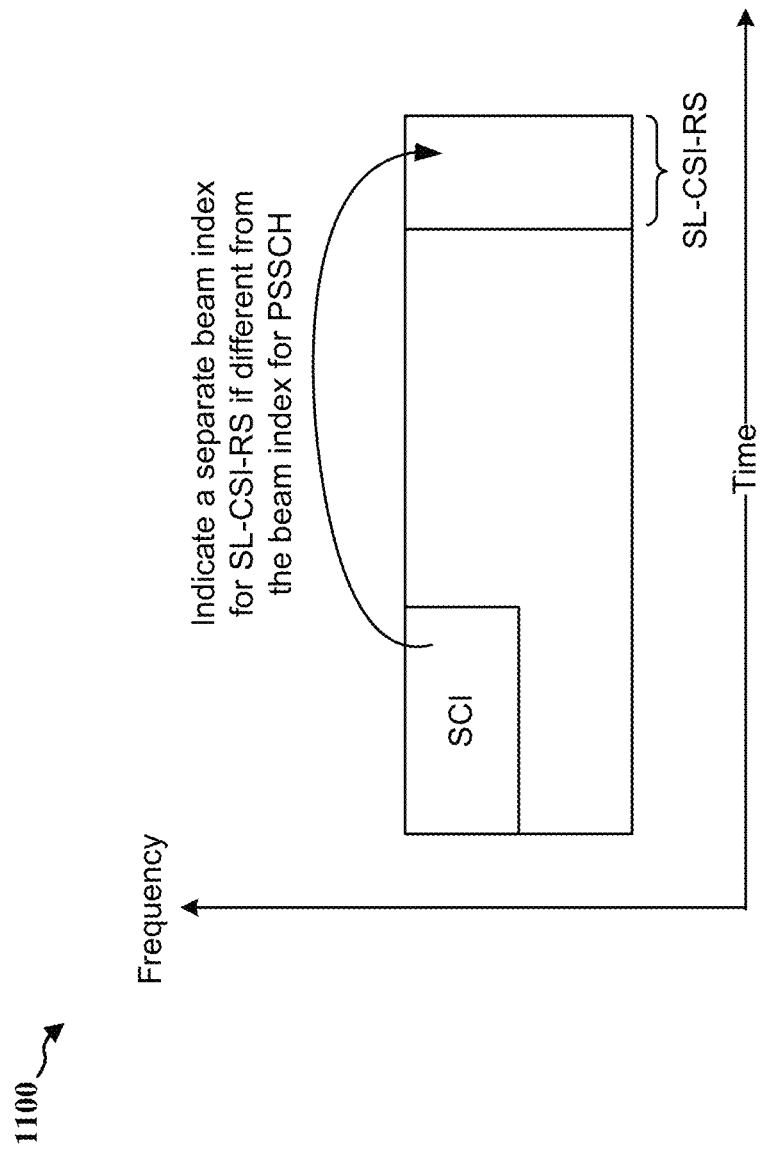
FIG. 11 is a diagram illustrating an example of indicating a separate beam index for SL-CSI-RS according to aspects of the present disclosure.

In some examples, if the first UE 1004 includes a directional SL-CSI-RS whose beam index (e.g., a second interference measurement beam index) is different from that for a PSSCH, the first UE 1004 may be configured to include in SCI respective interference measurement beam indices, as shown by diagram 1100 of FIG. 11, such that there may be one beam index for a PSSCH and another beam index for SL-CSI-RS to facilitate additional interference measurement on SL-CSI-RS. In such examples, other sidelink UEs, such as the second UE 1006, may follow a similar procedure and conduct interference measurement on one or more TX beams of the first UE 1004 based on the SL-CSI-RS, and the sidelink UEs may report the measured interference to the base station 1002 if the measured interference exceeds an interference threshold. In one example, the interference threshold used for SL-CSI-RS may be different from the interference threshold used for a PSSCH (e.g., the configured interference threshold at 1018). In addition, a sidelink UE, such as the second UE 1006, may average measurements on a PSSCH and measurements on SL-CSI-RS carrying the same beam index (e.g., the second interference measurement beam index), and the sidelink UE may apply different weights for the measurements on a PSSCH and for the measurements on SL-CSI-RS. In another example, the interference threshold used for SL-CSI-RS may be the same as the interference threshold used for a PSSCH. Similarly, a sidelink UE, such as the second UE 1006, may average measurements on a PSSCH and measurements on SL-CSI-RS carrying the same beam index, and the sidelink UE may apply different weights for the measurements on a PSSCH and for the measurements on SL-CSI-RS. In other words, while the directional grant may be used for scheduling PSSCH, a sidelink transmitting UE may also choose, being different from the granted beams to PSSCH, one or more beams for CSI-RS. As CSI-RS may occupy a small portion of the radio resources and its impact to other sidelink UEs may be small, the CSI-RS may also be used for interference measurement by other UEs (beside being using by the sidelink transmitting UE for CSI feedback). As such, to facilitate this, a different interference measurement beam index may be used for the CSI-RS. In one example, the sidelink transmitting UE may apply a L3 constraint on a set of beams (e.g., beams separate from beams used for PSSCH, and not all available beams) that the sidelink transmitting UE may explore (over CSI-RS) as an additional/secondary level design. In another example, the base station may further provide a preferred order/ranking for the sidelink transmitting UE in exploring these beams.

In another aspect of the present disclosure, referring back to FIG. 8, the transmitting UE 804 may be configured to request an interference measurement from one or more surrounding UEs. For example, the transmitting UE 804 may transmit a one-bit indication in SCI to request a one-shot interference measurement MAC-CE from surrounding SL UEs. After receiving the interference measurement MAC-CEs from one or more of the surrounding SL UEs, the transmitting UE 804 may transmit an interference measurement report to the base station 802 (e.g., via an UL MAC-CE or RRC signaling) that include interference measurements that exceed an interference threshold. In response, the base station 802 may determine whether to apply constraints 810 based on the received interference measurement report, such as described in connection with 808 of FIG. 8 and 1024 of FIG. 10. In such a configuration, the transmitting UE 804 may skip transmitting a beam index to the surrounding SL UEs (e.g., the transmitting UE 804 does not include the interference measurement beam index in the SCI).

Figure 12:
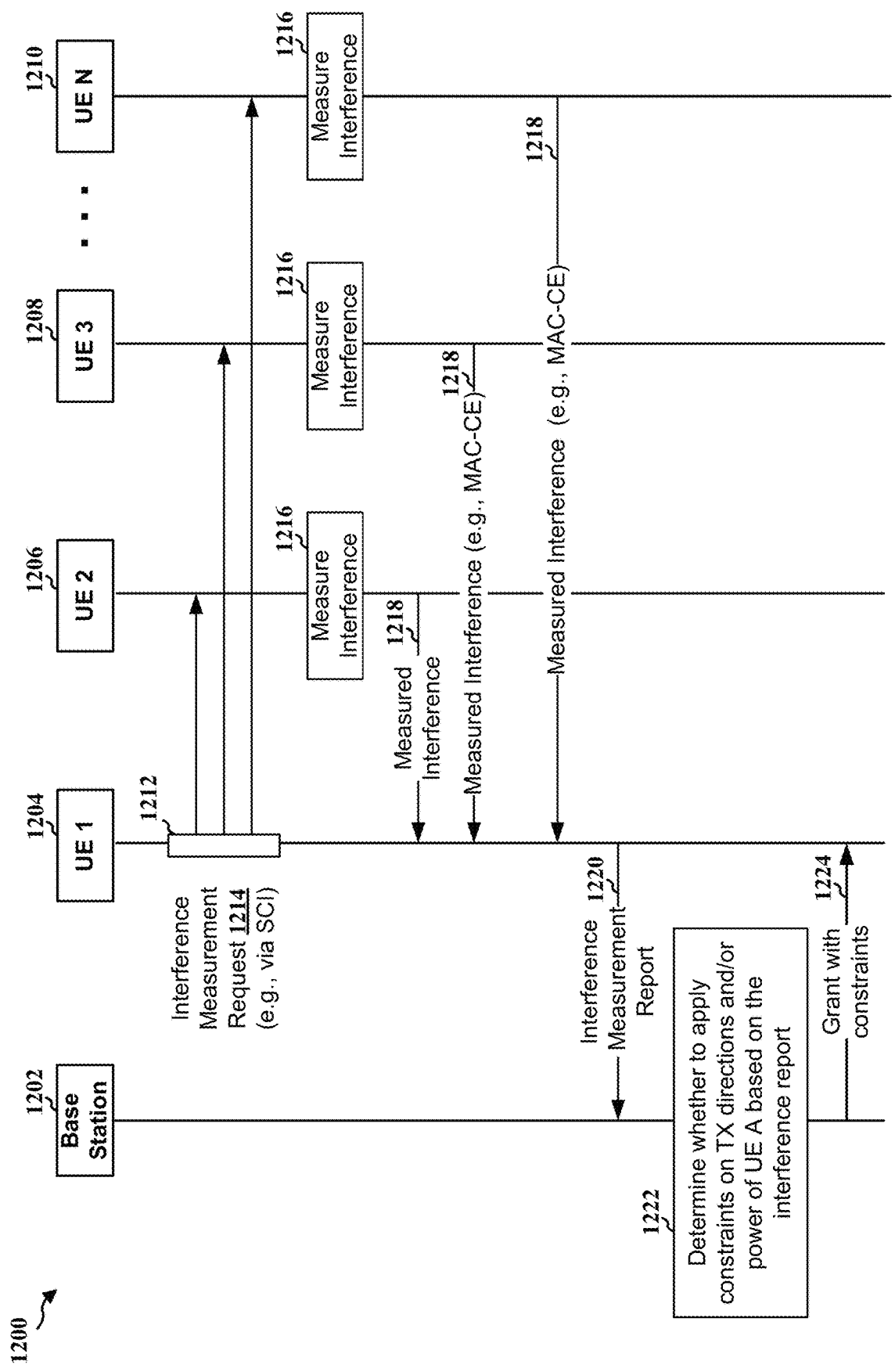
FIG. 12 is a communication flow illustrating an example of a transmitting UE requesting interference measurements from one or more surrounding UEs according to aspects of the present disclosure.

FIG. 12 is a communication flow 1200 illustrating an example of a transmitting UE requesting interference measurements from one or more surrounding UEs according to aspects of the present disclosure. In one aspect, as shown at 1212, a first UE 1204 may transmit an interference measurement request 1214, such as a one-bit indication in SCI, to request an interference measurement MAC-CE from surrounding UEs, which may include a second UE 1206, a third UE 1208, and up to $N^{th}$ UE 1210, etc. At 1216, after the surrounding UEs receive the interference measurement request 1214, one or more of the surrounding UEs may perform the interference measurement on the first UE 1204 (e.g., based on a transmission from the first UE). For example, after the second UE 1206, the third UE 1208, and the $N^{th}$ UE 1210 receive the interference measurement request 1214, the second UE 1206, the third UE 1208, and the $N^{th}$ UE 1210 may perform an interference measurement on the first UE 1204.

At 1218, one or more of the surrounding UEs that have performed the interference measurement on the first UE 1204 may transmit the measured interference to the first UE 1204, such as via a MAC-CE. For example, the second UE 1206, the third UE 1208, and the $N^{th}$ UE 1210 may each transmit an interference measurement MAC-CE to the first UE 1204.

At 1220, the first UE 1204 may include one or more received interference measurements that exceed an interference threshold in an interference measurement report, and the first UE 1204 may transmit the interference measurement report to a base station 1202. The interference threshold used by the interference measurement report may be different from the interference threshold used for PSSCH (e.g., as described in connection with FIG. 10) and/or the interference threshold used for SL-CSI-RS (e.g., as described in connection with FIG. 11).

At 1222, based on the interference measurement report, the base station 1202 may determine whether to apply constraints on TX directions and/or power of the first UE 1204, such as described in connection with 808 of FIG. 8 and/or 1024 of FIG. 10. For example, if the base station 1202 determines to apply constraints on TX directions and/or power of the first UE 1204, then at 1224, the base station 1202 may transmit a grant (e.g., the grant 826) to the first UE 1204 that includes the constraints, such as described in connection with 824 of FIG. 8 and/or 1026 of FIG. 10. As such, the base station 1202 may determine whether to apply directional constraints for a UE based on an interference measurement report received from the UE.

Figure 13:
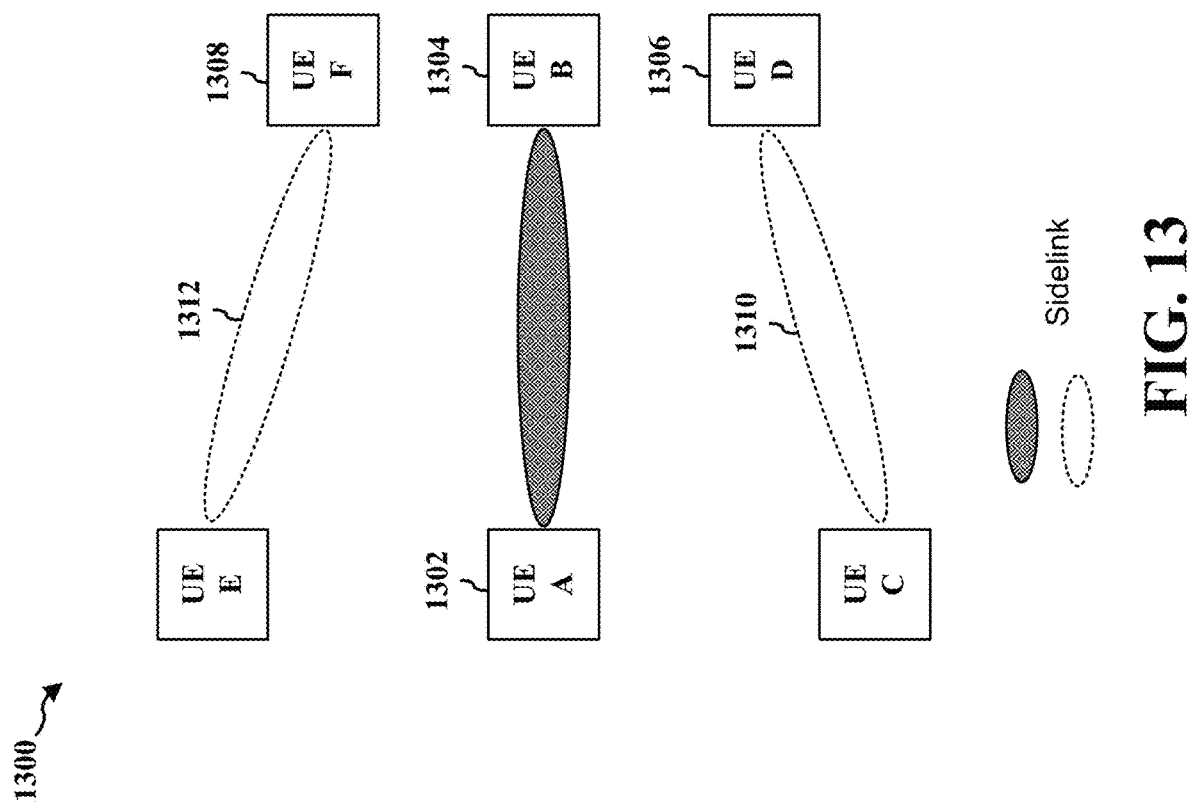
FIG. 13 is a diagram illustrating an example of UEs having different sensitivity to a received interference and/or UEs having different interference suppression capability.

In another aspect of the present disclosure, the interference threshold used for PSSCH (e.g., as described in connection with FIG. 10), the interference threshold used for SL-CSI-RS (e.g., as described in connection with FIG. 11), and/or the interference threshold used for the interference measurement report from the UE receiving the grant (e.g., as described in connection with FIG. 12) may be configured with a default value by a base station, such as via a SIB, RRC signaling, and/or a MAC-CE. In some examples, upon the default value, a pair of a sidelink transmitting UE and a sidelink receiving UE may further define and use an active value that is different from the default value, where the active value may be determined by the sidelink transmitting UE and/or the sidelink receiving UE based at least in part on a signal-to-interference-plus-noise ratio (SINR) measurement. In one example, as shown by diagram 1300 of FIG. 13, when UE-A 1302 is transmitting to UE-B 1304, UE-D 1306 and UE-F 1308 may have a different sensitivity to the received interference (e.g., interference from UE-A 1202's transmission) if there is a different traffic loading over respective link (e.g., different traffic between sidelink transmissions 1310 and 1312), and/or UE-D 1306 and UE-F 1308 may have a different interference suppression capability (e.g., a different number of receiving antennas). As a result, UE-D 1306 and UE-F 1308 may apply a different threshold (e.g., a second threshold different from the default threshold) to determine whether to report a measured interference based on the second threshold (e.g., when a measured interference is higher than the second threshold).

In another aspect of the present disclosure, if one or more UEs are transmitting uplink (UL) transmissions and sidelink transmissions using a same frequency band and/or are sharing a same radio frequency (RF), a base station may perform cross-link interference (CLI) measurements based on an UL sounding reference signal (SRS) transmitted from the one or more UEs in the UL transmissions, and the base station may build an approximate SL jamming graph based on the CLI measurements. Then, based on the SL jamming graph, the base station may determine whether to apply directional constraints on any of the one or more UEs. As such, a base station may configure CLI measurements for UEs with active SL link(s), where a UE or a base station may assign the same beam index (e.g., the interference measurement beam index described in connection with FIGS. 8 and 9) for TX beams of the UE transmitting the UL SRS, such that the TX beams associated with the SL-CRI-RS and TX beams associated with the UL SRS are QCLed at the UE.

In another aspect of the present disclosure, referring back to FIG. 8, the grant 826 may further include a time-stamp indicating when the constraints 810 were made (e.g., m slots earlier) and/or when the constraints are to be applied (e.g., a starting time) to guide or configure a transmitting UE, such as the transmitting UE 804, to conduct a rotation-aware back-off. Based on the rotation-aware back-off, if the transmitting UE rotates by an angle greater than an angle threshold θ after the instant specified by the time-stamp or after the starting time indicated in the time-stamp, the transmitting UE may be configured to apply a dB back-off in its transmission power. For example, a transmitting UE may be configured to apply a 10 dB back-off in its transmission power if the transmitting UE rotates for more than thirty degrees (30°) after a time indicated in a grant. As such, when the transmitting UE moves and rotates for more than thirty degrees after the indicated time, the transmitting UE may apply 10 dB back-off to its transmission power. In one example, a base station may indicate or configure the angle threshold θ and/or the σ dB back-off for a UE via a SIB, RRC signaling, and/or a MAC-CE.

Figure 14:
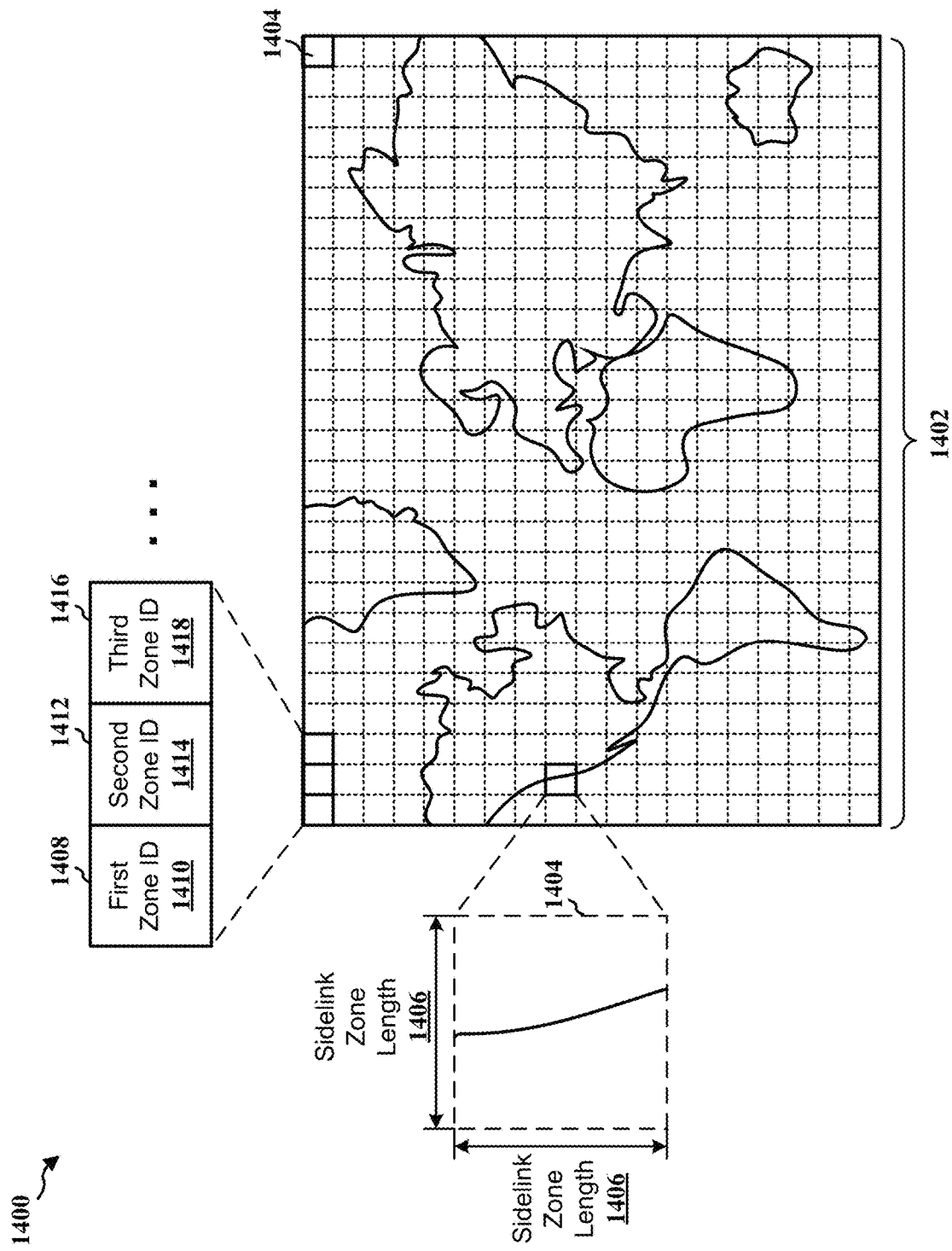
FIG. 14 is a diagram illustrating an example of identifying a geographical area based on a zone ID over a sidelink communication.

A sidelink UE may be able to identify a geographical area/zone in a sidelink communication based on a zone identifier (ID) that is associated with the geographical area/zone. The zone ID, as determined for sidelink communication, may be referred to herein as a "sidelink zone ID." FIG. 14 is a diagram 1400 illustrating an example of identifying a geographical area based on a zone ID over a sidelink communication. In one aspect, the earth 1402 may be divided into small squares 1404 of configurable zone length 1406 (e.g., a size between a defined maximum zone length and a defined minimum zone length: minimum zone length≤configured zone length 1406≤maximum zone length, etc.). Then, each of the squares 1404 may be assigned or may be associated with a zone ID. For example, a first square 1408 may be associated with a first zone ID 1410, a second square 1412 may be associated with a second zone ID 1414, a third square 1416 may be associated with a third zone ID 1418, etc. In one example, each zone ID may be N bits long, e.g., 12 bits. Based on the zone ID, a sidelink device may indicate a geographical area to another sidelink device based on one or more zone IDs associated with the geographical area. For example, if a first sidelink device is indicating or referring to the geographical area covered by the squares 1408, 1412, and 1416 to a second sidelink device, the first sidelink device may indicate the first zone ID 1410, the second zone ID 1414, and the third zone ID 1418 to the second sidelink device. For purposes of the present disclosure, the zone ID that is used in association with sidelink communications may be referred to as "sidelink zone ID."

In one example, a sidelink device (e.g., a UE) may determine a zone ID (e.g., an identity of a zone) in which the sidelink device is located based on the following formulae, if a sidelink zone (e.g., sl-ZoneConfig) is configured:

$x_1 = \text{Floor}(x/L) \text{Mod } 64;$ $y_1 = \text{Floor}(y/L) \text{Mod } 64;$ $\text{Zone\_id} = y_1 * 64 + x_1.$ where L may represent the value of sl-ZoneLength (e.g., the sidelink zone length 1406) included in the sl-ZoneConfig; x may represent the geodesic distance in longitude between the sidelink device's current location and the geographical coordinates (0, 0) according to a World Geodetic System 84 (WGS84) model, which may be expressed in meters; and y may represent the geodesic distance in latitude between the sidelink device's current location and the geographical coordinates (0, 0) according to the WGS84 model, which may be expressed in meters.

In another aspect of the present disclosure, a base station may apply directional constraints for a UE in a grant (e.g., the grant 826) based on a set of zone IDs (e.g., the sidelink zone IDs). Based on the grant, the UE may transmit a transmission using the granted resources to a receiving UE that is associated with at least one of the set of zone IDs (e.g., the receiving UE is located within one or more areas identified by the set of zone IDs), or the UE may be refrained from transmitting using the granted resources to a receiving UE that is associated with at least one of the set of zone IDs, etc.

Figure 15:
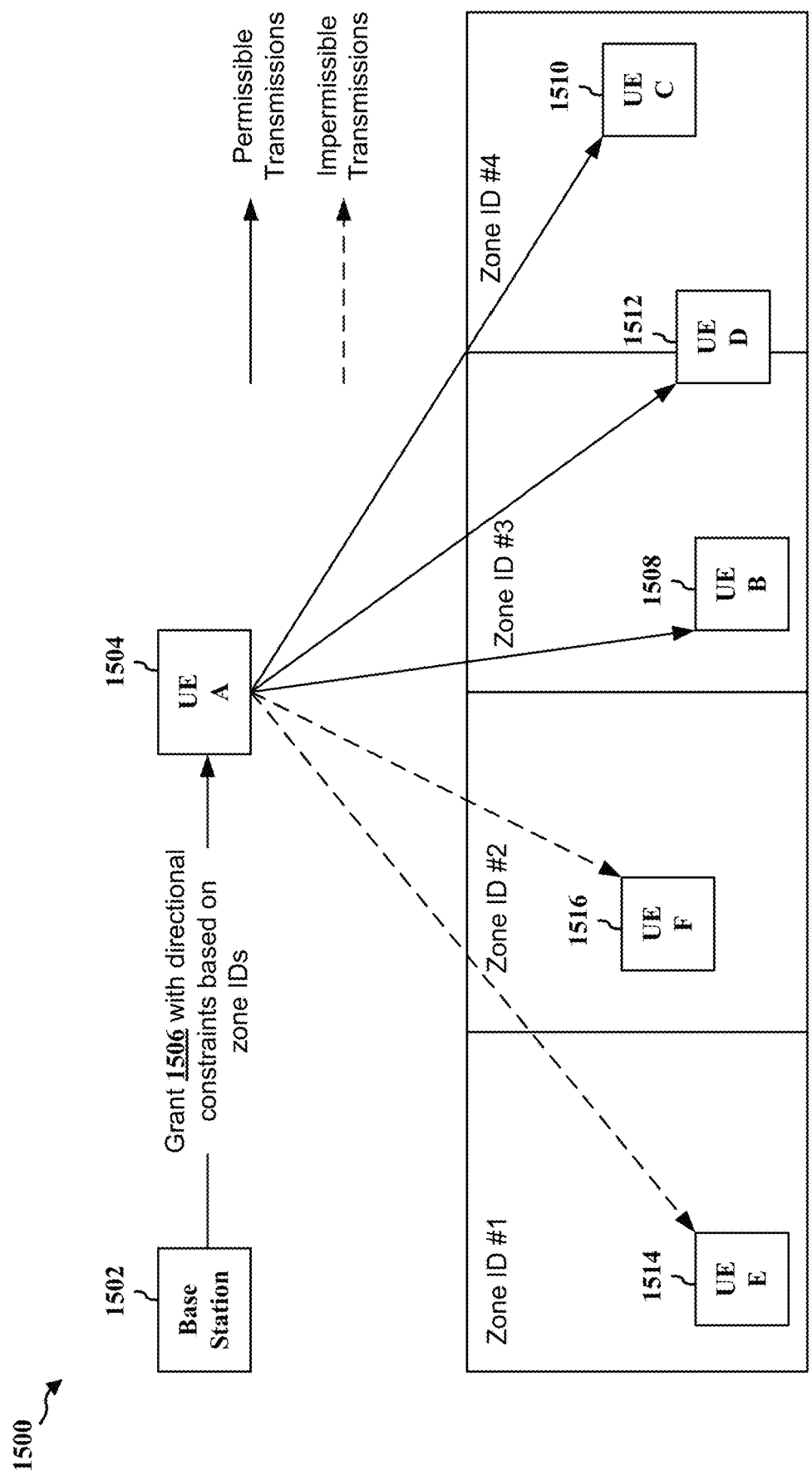
FIG. 15 is a diagram illustrating an example of a base station applying directional constraints for a UE based on a set of zone IDs according to aspects of the present disclosure.

FIG. 15 is a diagram 1500 illustrating an example of a base station applying directional constraints for a UE based on a set of zone IDs according to aspects of the present disclosure. In one example, a base station 1502 may transmit a grant 1506 for time and frequency resources to a UE 1504, where the grant 1506 may indicate that the grant 1506 is to be applied to a UE associated with a third zone ID (e.g., zone ID #3) and/or a fourth zone ID (e.g., zone ID #4). Thus, based on the grant 1506, the UE 1504 may transmit to a UE that is associated with at least one of the third zone ID or the fourth zone ID (e.g., the UE that is located within areas identified by the third zone ID and/or the fourth zone ID) using the granted time and frequency resources. For example, the UE 1504 may transmit to a UE 1508 that is associated with the third zone ID (e.g., located in an area identified by the third zone ID), the UE 1504 may transmit to a UE 1510 that is associated with the fourth zone ID (e.g., located in an area identified by the fourth zone ID), and/or the UE 1504 may transmit to a UE 1512 that is associated with both the third zone ID and the fourth zone ID (e.g., located in an area identified by both the third zone ID and the fourth zone ID), etc. Zone IDs associated with one or more UEs (e.g., UEs 1508, 1512, 1510) may be transmitted to the UE 1504 prior to the UE 1504's transmission using the grant 1506.

In another example, the grant 1506 may indicate that the grant 1506 may not be applied to a UE associated with a first zone ID (e.g., zone ID #1) and/or a second zone ID (e.g., zone ID #2). Thus, based on the grant 1506, the UE 1504 may not transmit to a UE that is associated with at least one of the first zone ID or the second zone ID (e.g., the UE that is located within areas identified by the third zone ID and/or the fourth zone ID) using the granted time and frequency resources. For example, the UE 1504 may not transmit to a UE 1514 that is associated with the first zone ID (e.g., located in an area identified by the first zone ID), and/or the UE 1504 may not transmit to a UE 1516 that is associated with the second zone ID (e.g., located in an area identified by the second zone ID), etc. Zone IDs associated with one or more UEs (e.g., UEs 1514, 1516) may be transmitted to the UE 1504 prior to the UE 1504's transmission using the grant 1506. As such, by specifying the set of allowed or disallowed zone IDs, a base station may indirectly control the TX direction of a transmitting UE, such as the transmitting UE 804 in FIG. 8.

In another aspect of the present disclosure, a base station may apply directional constraints for a UE in a grant (e.g., the grant 826) based on a set of UE identifications (IDs) associated with one or more UEs. Based on the grant, the UE may transmit a transmission using the granted resources to a receiving UE that is associated with at least one of the set of UE IDs, or the UE may be refrained from transmitting using the granted resources to a receiving UE that is associated with at least one of the UE IDs, etc. For example, the grant may specify a set of UE IDs of candidate receiving UEs allowed by the grant, or the grant may specify a set of UE IDs of candidate receiving UEs not allowed by the grant. Aspects presented herein may be used when the base station knows or determines the location of each candidate receiving UE. As such, by specifying the set of allowed or disallowed receiving UE IDs, a base station may indirectly control the TX direction of a transmitting UE, such as the transmitting UE 804 in FIG. 8.

Figure 16:
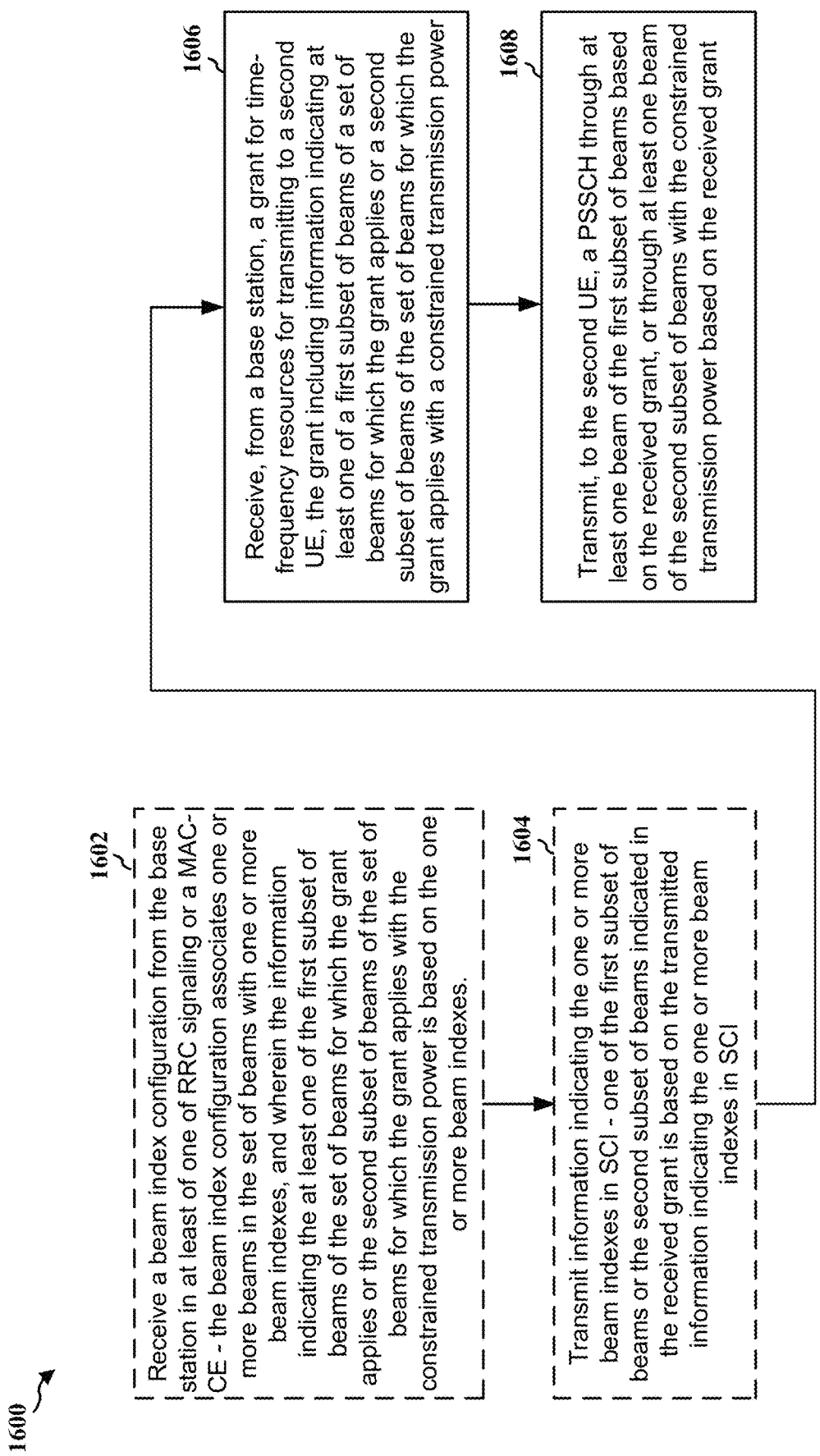
FIG. 16 is a flowchart of a method of wireless communication in accordance with aspects presented herein.

FIG. 16 is a flowchart 1600 of a method of wireless communication. The method may be performed by a UE or a component of a UE (e.g., the UE 104, 350, 402, 404, 406, 408, 504, 602, 622, 702, 804, 1004, 1204, 1504; the apparatus 1702; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to receive and process a grant for time and frequency resources from a base station that has constraints on one or more transmission directions of the UE.

At 1602, the UE may receive a beam index configuration from the base station in at least of one of RRC signaling or a MAC-CE, where the beam index configuration may associate one or more beams in the set of beams with one or more beam indexes, and where the information indicating the at least one of the first subset of beams of the set of beams for which the grant applies or the second subset of beams of the set of beams for which the grant applies with the constrained transmission power may be based on the one or more beam indexes, such as described in connection with FIGS. 8 and 9. For example, at 842, the transmitting UE 804 may receive a beam index configuration from the base station 802, where the beam index configuration may associate one or more TX beams of the transmitting UE 804 with a beam index. The reception and process of the beam index configuration may be performed, e.g., by the beam index configuration process component 1740 and/or the reception component 1730 of the apparatus 1702 in FIG. 17.

In one example, each beam in the set of beams may be associated with an SL-CRI, and the one or more beams in the set of beams may be associated with the one or more beam indexes based on their corresponding SL-CRIs, such as described in connection with FIG. 8. In such an example, each of the one or more beam indexes may be associated with a different SL-CRI that corresponds to one beam in the set of beams, or each of the one or more beam indexes may be associated with multiple SL-CRIs that correspond to multiple beams in the set of beams (e.g., as described in connection with FIG. 9).

At 1604, the UE may transmit information indicating the one or more beam indexes in SCI, where one of the first subset of beams or the second subset of beams indicated in the received grant may be based on the transmitted information indicating the one or more beam indexes in SCI, such as described in connection with FIG. 10. For example, at 1008, the first UE 1004 may transmit its beam index to the second UE 1006 in SCI. The transmission of the information indicating the one or more beam indexes may be performed, e.g., by the beam index transmission component 1742 and/or the transmission component 1734 of the apparatus 1702 in FIG. 17.

In one example, the transmitted information in the SCI may further indicate one or more additional beam indexes associated with one or more beams used for transmitting CSI-RS, and the one of the first subset of beams or the second subset of beams indicated in the received grant may be further based on the transmitted information indicating the one or more additional beam indexes, such as described in connection with FIG. 11.

At 1606, the UE may receive, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power, such as described in connection with FIGS. 8, 10, 12 and 15. For example, at 824, the transmitting UE 804 may receive the grant 826 for time-frequency resources for transmitting to the receiving UE 806 from the base station 802, where the grant 826 may include constraints 810 indicating one or more beams which the grant applies with a constrained direction or power. The reception of the grant may be performed, e.g., by the grant process component 1744 and/or the reception component 1730 of the apparatus 1702 in FIG. 17. The grant may be one of a dynamic grant or a configured grant.

In one example, the first subset of beams may correspond to a first subset of transmit directions of a set of transmit directions, and the second subset of beams may correspond to a second subset of transmit directions of the set of transmit directions. In another example, the first subset of beams may be a proper subset of the set of beams (e.g., the first subset of beams may include less than the entire set of beams), and/or the second subset of beams may be a proper subset of the set of beams (e.g., the second subset of beams may include less than the entire set of beams).

In one example, the information may indicate the first subset of beams of the set of beams for which the grant applies, and the PSSCH may be transmitted through at least one beam of the first subset of beams based on the received grant, such as described in connection with FIG. 8.

In another example, the UE may transmit, to one or more UEs, a request to measure interference between the UE and the one or more UEs. Then, the UE may receive, from the one or more UEs based on the transmitted request, one or more interference measurements. Then, the UE may transmit, to the base station, information indicating interference measurements of the one or more interference measurements that exceed an interference threshold, where the information indicating the at least one of the first subset of beams of the set of beams for which the grant applies or the second subset of beams of the set of beams for which the grant applies with the constrained transmission power may be based on the interference measurements that exceed the interference threshold, such as described in connection with FIG. 12. In such an example, the UE may transmit the request in SL SCI, the UE may receive the one or more interference measurements from the one or more UEs in an SL MAC-CE, and the UE may transmit the interference measurements that exceed the interference threshold to the base station in at least one of a MAC-CE or RRC signaling. In such an example, the interference threshold may be configured by the base station.

In another example, the UE may transmit, to the base station, UL SRS for a CLI measurement, where the information indicating the at least one of the first subset of beams of the set of beams for which the grant applies or the second subset of beams of the set of beams for which the grant applies with the constrained transmission power may be based on the transmitted UL SRS for the CLI measurement.

In another example, the information may indicate the second subset of beams of the set of beams for which the grant applies with the constrained transmission power, and the PSSCH may be transmitted through at least one beam of the second subset of beams with the constrained transmission power based on the received grant, such as described in connection with 840 of FIG. 8. In such an example, the UE may receive a configuration configuring an amount of transmission power to be constrained via at least one of a SIB, RRC signaling, or a MAC-CE.

In another example, the grant may include a time stamp indicating a starting time at which the UE may apply the information indicating the at least one of the first subset of beams of the set of beams for which the grant applies or the second subset of beams of the set of beams for which the grant applies with the constrained transmission power. In such an example, the UE may reduce the UE's transmission power for one or more beams of the at least one beam of the first subset of beams or the second subset of beams by a back-off amount when the UE rotates by an angle greater than an angle threshold after the starting time. In such an example, the back-off amount and the angle threshold may be received by the base station via at least one of a SIB, RRC signaling, or a MAC-CE.

In another example, the information indicating the at least one of the first subset of beams of the set of beams for which the grant applies or the second subset of beams of the set of beams for which the grant applies with a constrained transmission power may include information indicating one or more zone IDs associated with transmit directions for which the grant applies, such as described in connection with FIG. 15.

In another example, the information indicating the at least one of the first subset of beams of the set of beams for which the grant applies or the second subset of beams of the set of beams for which the grant applies with a constrained transmission power may include information indicating one or more UE IDs associated with transmit directions for which the grant applies.

At 1608, the UE may transmit, to the second UE, a PSSCH through at least one beam of the first subset of beams based on the received grant, or through at least one beam of the second subset of beams with the constrained transmission power based on the received grant, such as described in connection with FIG. 8. For example, at 836, the transmitting UE 804 may transmit a PSSCH to the receiving UE 806 based on the grant 826 through at least one beam of the first subset of beams based on the received grant (e.g., as shown at 838), or through at least one beam of the second subset of beams with the constrained transmission power (e.g., as shown at 840). The transmission of the PSSCH may be performed, e.g., by the constrained transmission configuration component 1746 and/or the transmission component 1734 of the apparatus 1702 in FIG. 17.

Figure 17:
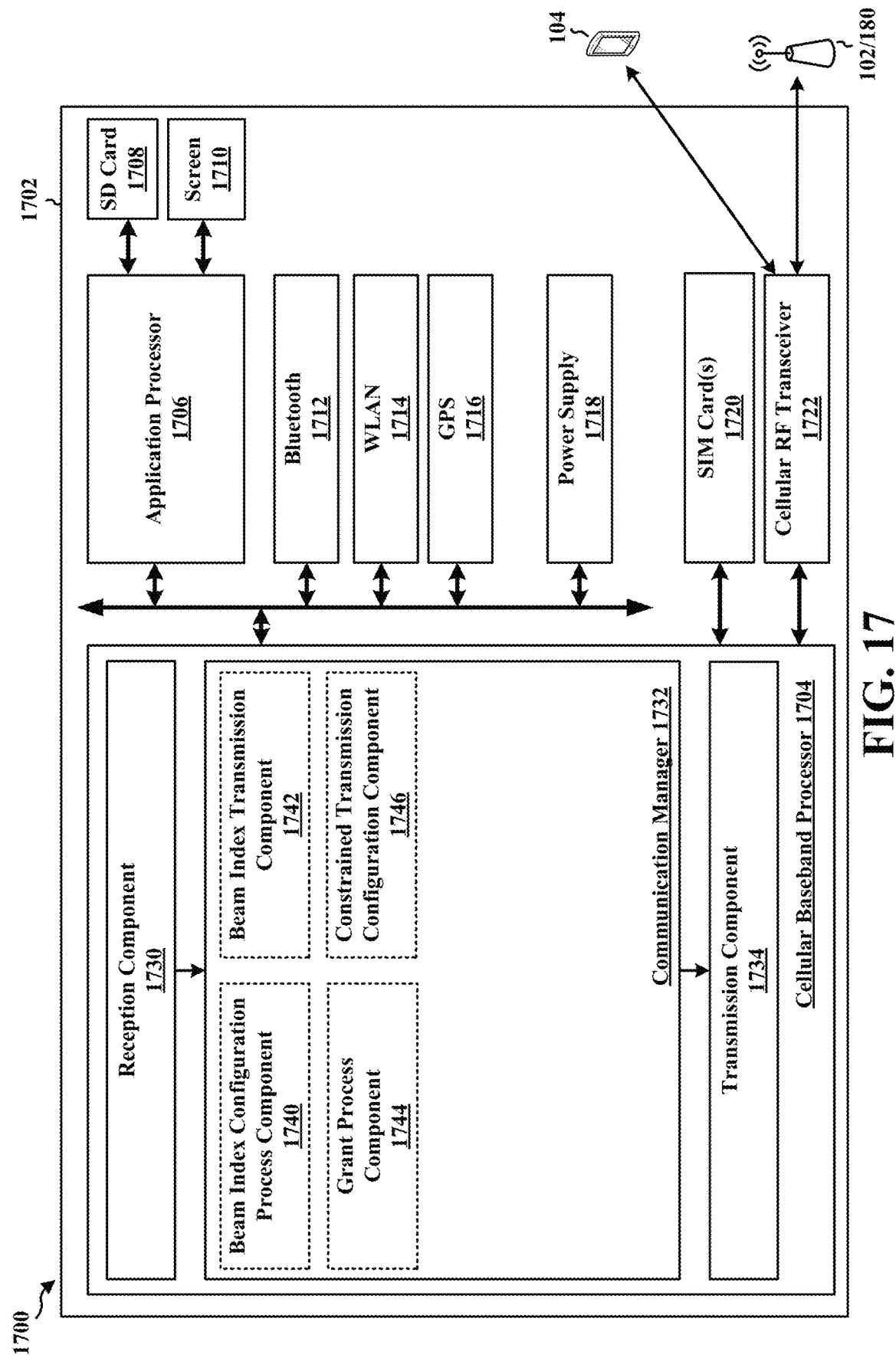
FIG. 17 is a diagram illustrating an example of a hardware implementation for an example apparatus in accordance with aspects presented herein.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the aforediscussed additional modules of the apparatus 1702.

The communication manager 1732 includes a beam index configuration process component 1740 that is configured to receive a beam index configuration from the base station via at least of one of RRC signaling or a MAC-CE, where the beam index configuration may associate one or more beams in the set of beams with one or more beam indexes, and where the information indicating the at least one of the first subset of beams of the set of beams for which the grant applies or the second subset of beams of the set of beams for which the grant applies with the constrained transmission power may be based on the one or more beam indexes, e.g., as described in connection with 1602 of FIG. 16. The communication manager 1732 further includes a beam index transmission component 1742 that is configured to transmit information indicating the one or more beam indexes in SCI, where one of the first subset of beams or the second subset of beams indicated in the received grant may be based on the transmitted information indicating the one or more beam indexes in SCI, e.g., as described in connection with 1604 of FIG. 16. The communication manager 1732 further includes a grant process component 1744 that is configured to receive, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power, e.g., as described in connection with 1606 of FIG. 16. The communication manager 1732 further includes a constrained transmission configuration component 1746 that is configured to transmit, to the second UE, a PSSCH through at least one beam of the first subset of beams based on the received grant, or through at least one beam of the second subset of beams with the constrained transmission power based on the received grant, e.g., as described in connection with 1608 of FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for receiving a beam index configuration from the base station via at least of one of RRC signaling or a MAC-CE, where the beam index configuration may associate one or more beams in the set of beams with one or more beam indexes, and where the information indicating the at least one of the first subset of beams of the set of beams for which the grant applies or the second subset of beams of the set of beams for which the grant applies with the constrained transmission power may be based on the one or more beam indexes (e.g., the beam index configuration process component 1740 and/or the reception component 1730). The apparatus 1702 includes means for transmitting information indicating the one or more beam indexes in SCI, where one of the first subset of beams or the second subset of beams indicated in the received grant may be based on the transmitted information indicating the one or more beam indexes in SCI (e.g., the beam index transmission component 1742 and/or the transmission component 1734). The apparatus 1702 includes means for receiving, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power (e.g., the grant process component 1744 and/or the reception component 1730). The apparatus 1702 includes means for transmitting, to the second UE, a PSSCH through at least one beam of the first subset of beams based on the received grant, or through at least one beam of the second subset of beams with the constrained transmission power based on the received grant (e.g., the constrained transmission configuration component 1746 and/or the transmission component 1734).

In one configuration, each beam in the set of beams may be associated with an SL-CRI, and the one or more beams in the set of beams may be associated with the one or more beam indexes based on their corresponding SL-CRIs. In such a configuration, each of the one or more beam indexes may be associated with a different SL-CRI that corresponds to one beam in the set of beams, or each of the one or more beam indexes may be associated with multiple SL-CRIs that correspond to multiple beams in the set of beams.

In another configuration, the transmitted information in the SCI may further indicate one or more additional beam indexes associated with one or more beams used for transmitting CSI-RS, and the one of the first subset of beams or the second subset of beams indicated in the received grant may be further based on the transmitted information indicating the one or more additional beam indexes.

In another configuration, the information may indicate the first subset of beams of the set of beams for which the grant applies, and the PSSCH may be transmitted through at least one beam of the first subset of beams based on the received grant.

In another configuration, the UE may transmit, to one or more UEs, a request to measure interference between the UE and the one or more UEs. Then, the UE may receive, from the one or more UEs based on the transmitted request, one or more interference measurements. Then, the UE may transmit, to the base station, information indicating interference measurements of the one or more interference measurements that exceed an interference threshold, where the information indicating the at least one of the first subset of beams of the set of beams for which the grant applies or the second subset of beams of the set of beams for which the grant applies with the constrained transmission power may be based on the interference measurements that exceed the interference threshold. In such a configuration, the UE may transmit the request in SL SCI, the UE may receive the one or more interference measurements from the one or more UEs in an SL MAC-CE, and the UE may transmit the interference measurements that exceed the interference threshold to the base station via at least one of a MAC-CE or RRC signaling. In such a configuration, the interference threshold may be configured by the base station.

In another configuration, the UE may transmit, to the base station, UL SRS for a CLI measurement, where the information indicating the at least one of the first subset of beams of the set of beams for which the grant applies or the second subset of beams of the set of beams for which the grant applies with the constrained transmission power may be based on the transmitted UL SRS for the CLI measurement.

In another configuration, the information may indicate the second subset of beams of the set of beams for which the grant applies with the constrained transmission power, and the PSSCH may be transmitted through at least one beam of the second subset of beams with the constrained transmission power based on the received grant. In such a configuration, the UE may receive a configuration configuring an amount of transmission power to be constrained via at least one of a SIB, RRC signaling, or a MAC-CE.

In another configuration, the grant may include a time stamp indicating a starting time at which the UE may apply the information indicating the at least one of the first subset of beams of the set of beams for which the grant applies or the second subset of beams of the set of beams for which the grant applies with the constrained transmission power. In such a configuration, the UE may reduce the UE's transmission power for one or more beams of the at least one beam of the first subset of beams or the second subset of beams by a back-off amount when the UE rotates by an angle greater than an angle threshold after the starting time. In such a configuration, the back-off amount and the angle threshold may be received by the base station via at least one of a SIB, RRC signaling, or a MAC-CE.

In another configuration, the information indicating the at least one of the first subset of beams of the set of beams for which the grant applies or the second subset of beams of the set of beams for which the grant applies with a constrained transmission power may include information indicating one or more zone IDs associated with transmit directions for which the grant applies.

In another configuration, the information indicating the at least one of the first subset of beams of the set of beams for which the grant applies or the second subset of beams of the set of beams for which the grant applies with a constrained transmission power may include information indicating one or more UE IDs associated with transmit directions for which the grant applies.

The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
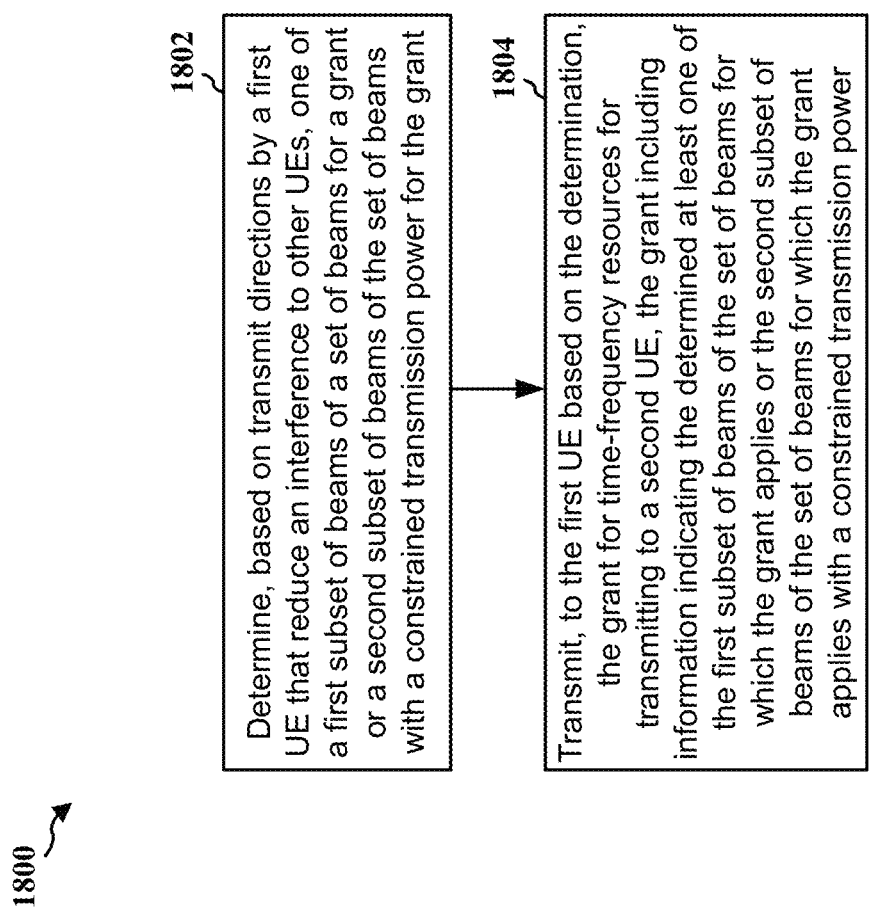
FIG. 18 is a flowchart of a method of wireless communication in accordance with aspects presented herein.

FIG. 18 is a flowchart 1800 of a method of wireless communication. The method may be performed by a base station or a component of a base station (e.g., the base station 102, 180, 310, 502, 640, 642, 740, 802, 1002, 1202, 1502; the apparatus 1902; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to determine and apply constraints on one or more transmission directions of a UE to reduce interference between UEs.

At 1802, the base station may determine, based on transmit directions by a first UE that reduce an interference to other UEs, one of a first subset of beams of a set of beams for a grant or a second subset of beams of the set of beams with a constrained transmission power for the grant, such as described in connection with FIGS. 8, 10, and 12. For example, at 808, the base station 802 may determine, based on transmit directions by the transmitting UE 804 that reduce an interference to other UEs, constraints 810 on TX directions and/or power of the transmitting UE 804. The determination of the one of a first subset of beams of a set of beams for a grant or a second subset of beams of the set of beams with a constrained transmission power for the grant may be performed, e.g., by the constraints determination component 1940 of the apparatus 1902 in FIG. 19.

In one example, the first subset of beams may correspond to a first subset of transmit directions of a set of transmit directions, and the second subset of beams may correspond to a second subset of transmit directions of the set of transmit directions. In another example, the first subset of beams may be a proper subset of the set of beams (e.g., the first subset of beams may include less than the entire set of beams), and/or the second subset of beams may be a proper subset of the set of beams (e.g., the second subset of beams may include less than the entire set of beams).

At 1804, the base station may transmit, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power, such as described in connection with FIGS. 8, 10, and 12. For example, at 824, the base station 802 may transmit the grant 826 that includes the constraints 810 on TX directions to the transmitting UE 804. The transmission of the grant may be performed, e.g., by the grant configuration component 1942 and/or the transmission component 1934 of the apparatus 1902 in FIG. 19.

Figure 19:
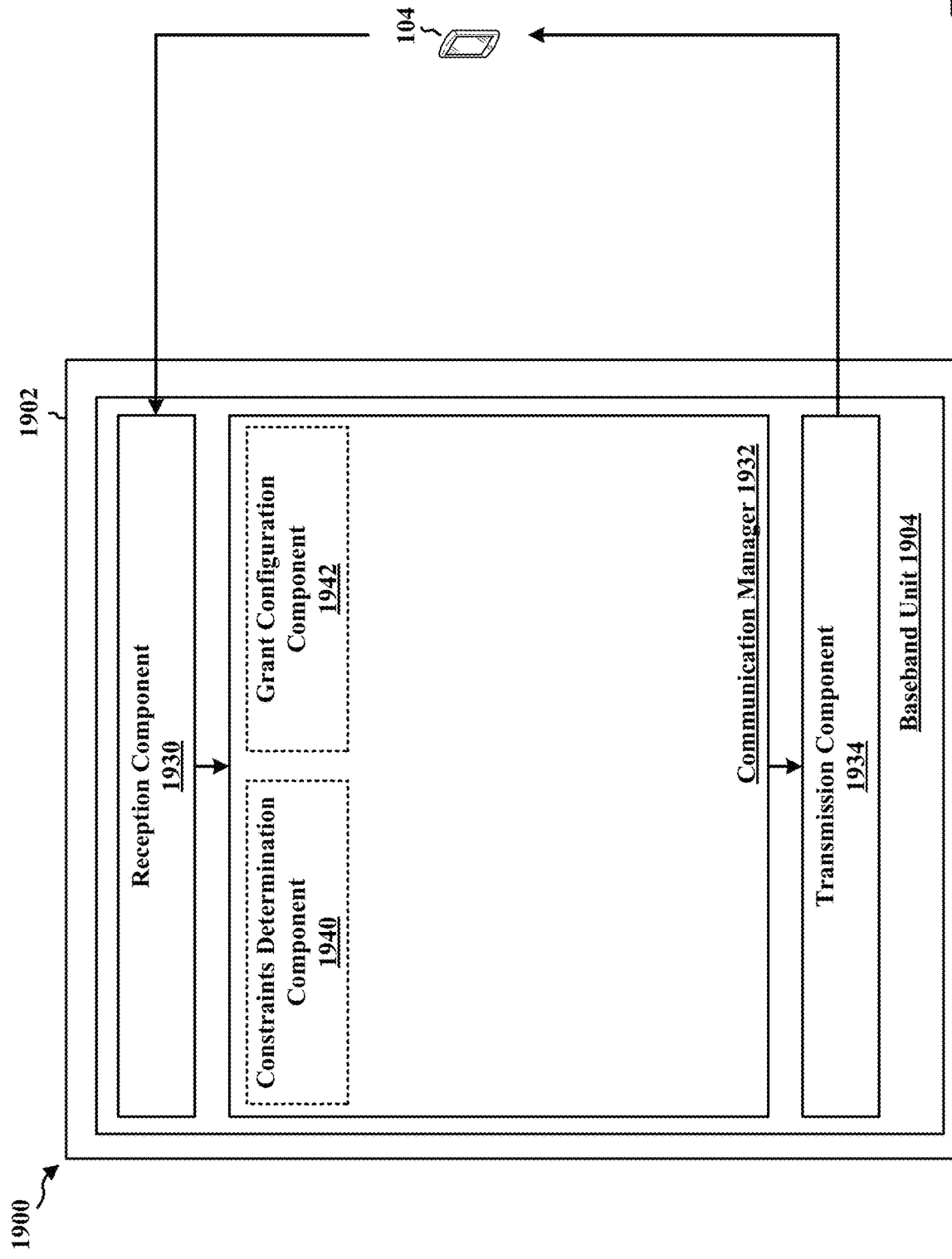
FIG. 19 is a diagram illustrating an example of a hardware implementation for an example apparatus in accordance with aspects presented herein.

FIG. 19 is a diagram 1900 illustrating an example of a hardware implementation for an apparatus 1902. The apparatus 1902 is a BS and includes a baseband unit 1904. The baseband unit 1904 may communicate through a cellular RF transceiver with the UE 194. The baseband unit 1904 may include a computer-readable medium/memory.

The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the BS 310 and may include the memory 376 and/or at least one of the TX processor 316, the RX processor 370, and the controller/processor 375.

The communication manager 1932 includes a constraints determination component 1940 that is configured to transmit, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power, e.g., as described in connection with 1802 of FIG. 18. The communication manager 1932 further includes a grant configuration component 1942 that is configured to transmit, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power, e.g., as described in connection with 1804 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for determining, based on transmit directions by a first user equipment (UE) that reduce an interference to other UEs, one of a first subset of beams of a set of beams for a grant or a second subset of beams of the set of beams with a constrained transmission power for the grant (e.g., the constraints determination component 1940). The apparatus 1902 includes means for transmitting, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power (e.g., the grant configuration component 1942 and/or the transmission component 1934).

The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples set forth additional aspects and are illustrative only and aspects thereof may be combined with aspects of other embodiments or teaching described herein, without limitation.

Aspect 1 is a method of wireless communication of a UE, comprising: receiving, from a base station, a grant for time-frequency resources for transmitting to a second UE, the grant including information indicating at least one of a first subset of beams of a set of beams for which the grant applies or a second subset of beams of the set of beams for which the grant applies with a constrained transmission power; and transmitting, to the second UE, a physical sidelink shared channel (PSSCH) through at least one beam of the first subset of beams based on the received grant, or through at least one beam of the second subset of beams with the constrained transmission power based on the received grant.

In aspect 2, the method of aspect 1 further includes that the information indicates the first subset of beams of the set of beams for which the grant applies, and the PSSCH is transmitted through at least one beam of the first subset of beams based on the received grant.

In aspect 3, the method of aspect 1 or aspect 2 further includes that the information specifies a third subset of beams for which the grant does not apply, the first subset of beams including beams in the set of beams excluding the third subset of beams.

In aspect 4, the method of any of aspects 1-3 further includes that the grant is one of a dynamic grant or a configured grant.

In aspect 5, the method of any of aspects 1-4 further includes receiving a beam index configuration from the base station in at least of one of RRC signaling or a MAC-CE, where the beam index configuration associates one or more beams in the set of beams with one or more beam indexes, and where the information indicating the at least one of the first subset of beams of the set of beams for which the grant applies or the second subset of beams of the set of beams for which the grant applies with the constrained transmission power is based on the one or more beam indexes.

In aspect 6, the method of any of aspects 1-5 further includes that each beam in the set of beams is associated with an SL-CRI, and the one or more beams in the set of beams are associated with the one or more beam indexes based on their corresponding SL-CRIs.

In aspect 7, the method of any of aspects 1-6 further includes that each of the one or more beam indexes is associated with a different SL-CRI that corresponds to one beam in the set of beams.

In aspect 8, the method of any of aspects 1-7 further includes that each of the one or more beam indexes is associated with multiple SL-CRIs that correspond to multiple beams in the set of beams.

In aspect 9, the method of any of aspects 1-8 further includes transmitting information indicating the one or more beam indexes in SCI, where one of the first subset of beams or the second subset of beams indicated in the received grant is based on the transmitted information indicating the one or more beam indexes in SCI.

In aspect 10, the method of any of aspects 1-9 further includes that the transmitted information in the SCI further indicates one or more additional beam indexes associated with one or more beams used for transmitting CSI-RS, and the one of the first subset of beams or the second subset of beams indicated in the received grant is further based on the transmitted information indicating the one or more additional beam indexes.

In aspect 11, the method of any of aspects 1-10 further includes transmitting, to one or more UEs, a request to measure interference between the first UE and the one or more UEs; receiving, from the one or more UEs based on the transmitted request, one or more interference measurements; and transmitting, to the base station, information indicating interference measurements of the one or more interference measurements that exceed an interference threshold, where the information indicating the at least one of the first subset of beams of the set of beams for which the grant applies or the second subset of beams of the set of beams for which the grant applies with the constrained transmission power is based on the interference measurements that exceed the interference threshold.

In aspect 12, the method of any of aspects 1-11 further includes that the request is transmitted in SL SCI, the first UE receives the one or more interference measurements from the one or more UEs in an SL MAC-CE, and the first UE transmits the interference measurements that exceed the interference threshold to the base station in at least one of a MAC-CE or RRC signaling.

In aspect 13, the method of any of aspects 1-12 further includes that the interference threshold is configured by the base station.

In aspect 14, the method of any of aspects 1-13 further includes transmitting, to the base station, UL SRS for a CLI measurement, where the information indicating the at least one of the first subset of beams of the set of beams for which the grant applies or the second subset of beams of the set of beams for which the grant applies with the constrained transmission power is based on the transmitted UL SRS for the CLI measurement In aspect 15, the method of any of aspects 1-14 further includes that the information indicates the second subset of beams of the set of beams for which the grant applies with the constrained transmission power, and the PSSCH is transmitted through at least one beam of the second subset of beams with the constrained transmission power based on the received grant.

In aspect 16, the method of any of aspects 1-15 further includes receiving a configuration configuring an amount of transmission power to be constrained via at least one of a SIB, RRC signaling, or a MAC-CE.

In aspect 17, the method of any of aspects 1-16 further includes that the grant includes a time stamp indicating a starting time at which the first UE is to apply the information indicating the at least one of the first subset of beams of the set of beams for which the grant applies or the second subset of beams of the set of beams for which the grant applies with the constrained transmission power.

In aspect 18, the method of any of aspects 1-17 further includes reducing the first UE's transmission power for one or more beams of the at least one beam of the first subset of beams or the second subset of beams by a back-off amount when the first UE rotates by an angle greater than an angle threshold after the starting time.

In aspect 19, the method of any of aspects 1-18 further includes that the back-off amount and the angle threshold are received by the base station via at least one of a SIB, RRC signaling, or a MAC-CE.

In aspect 20, the method of any of aspects 1-19 further includes that the information indicating the at least one of the first subset of beams of the set of beams for which the grant applies or the second subset of beams of the set of beams for which the grant applies with a constrained transmission power comprises information indicating one or more zone IDs or one or more UE IDs associated with transmit directions for which the grant applies.

In aspect 21, the method of any of aspects 1-20 further includes that the information indicating the first subset of beams corresponds to a first subset of transmit directions of a set of transmit directions, and the second subset of beams corresponds to a second subset of transmit directions of the set of transmit directions.

Aspect 22 is an apparatus for wireless communication including at least one processor coupled to a memory and configured to implement a method as in any of aspects 1 to 21.

Aspect 23 is an apparatus for wireless communication including means for implementing a method as in any of aspects 1 to 21.

Aspect 24 is a non-transitory computer-readable medium storing computer executable code, where the code when executed by a processor causes the processor to implement a method as in any of aspects 1 to 21.

Aspect 25 is a method of wireless communication of a base station, comprising: determining, based on transmit directions by a first user equipment (UE) that reduce an interference to other UEs, one of a first subset of beams of a set of beams for a grant or a second subset of beams of the set of beams with a constrained transmission power for the grant; and transmitting, to the first UE based on the determination, the grant for time-frequency resources for transmitting to a second UE, the grant including information indicating the determined at least one of the first subset of beams of the set of beams for which the grant applies or the second subset of beams of the set of beams for which the grant applies with a constrained transmission power.

In aspect 26, the method of aspect 25 further includes that the information indicates the first subset of beams of the set of beams for which the grant applies.

In aspect 27, the method of aspect 25 or aspect 26 further includes that the information specifies a third subset of beams for which the grant does not apply, the first subset of beams including beams in the set of beams excluding the third subset of beams.

In aspect 28, the method of any of aspects 25-27 further includes that the grant is one of a dynamic grant or a configured grant.

In aspect 29, the method of any of aspects 25-28 further includes transmitting a beam index configuration to the first UE in at least of one of RRC signaling or a MAC-CE, where the beam index configuration associates one or more beams in the set of beams with one or more beam indexes, and where the information indicating the at least one of the first subset of beams of the set of beams for which the grant applies or the second subset of beams of the set of beams for which the grant applies with the constrained transmission power is based on the one or more beam indexes.

In aspect 30, the method of any of aspects 25-29 further includes receiving, from the first UE, information indicating one or more interference measurements between the first UE and one or more UEs that exceed an interference threshold, where the information indicating the at least one of the first subset of beams of the set of beams for which the grant applies or the second subset of beams of the set of beams for which the grant applies with the constrained transmission power is based on the one or more interference measurements that exceed the interference threshold.

In aspect 31, the method of any of aspects 25-30 further includes receiving, from the first UE, UL SRS for a CLI measurement, where the information indicating the at least one of the first subset of beams of the set of beams for which the grant applies or the second subset of beams of the set of beams for which the grant applies with the constrained transmission power is based on the received UL SRS for the CLI measurement.

Aspect 32 is an apparatus for wireless communication including at least one processor coupled to a memory and configured to implement a method as in any of aspects 25 to 31.

Aspect 33 is an apparatus for wireless communication including means for implementing a method as in any of aspects 25 to 31.

Aspect 34 is a non-transitory computer-readable medium storing computer executable code, where the code when executed by a processor causes the processor to implement a method as in any of aspects 25 to 31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), comprising:
   a memory; and
   at least one processor coupled to the memory and configured to:
      receive, from a base station, a grant for time-frequency resources for transmitting to a second UE, the grant including information indicating at least one of a first subset of beams of a set of beams for which the grant does not apply or a second subset of beams of the set of beams for which the grant applies with a constrained transmission power; and
      transmit, to the second UE, a physical sidelink shared channel (PSSCH) through at least one beam in the set of beams excluding the first subset of beams based on the received grant, or through at least one beam of the second subset of beams with the constrained transmission power based on the received grant.

2. The apparatus of claim 1, wherein the information indicates the first subset of beams of the set of beams for which the grant does not apply, and the PSSCH is transmitted through at least one beam in the set of beams excluding the first subset of beams based on the received grant.

3. The apparatus of claim 2, wherein the information specifies a third subset of beams for which the grant applies, the first subset of beams including beams in the set of beams excluding the third subset of beams.

4. The apparatus of claim 1, wherein the grant is one of a dynamic grant (DG) or a configured grant (CG).

5. The apparatus of claim 1, wherein the at least one processor is further configured to:
   receive a beam index configuration from the base station in at least of one of radio resource control (RRC) signaling or a medium access control-control element (MAC-CE),
   wherein the beam index configuration associates one or more beams in the set of beams with one or more beam indexes, and wherein the information indicating the at least one of the first subset of beams of the set of beams for which the grant does not apply or the second subset of beams of the set of beams for which the grant applies with the constrained transmission power is based on the one or more beam indexes.

6. The apparatus of claim 5, wherein each beam in the set of beams is associated with a sidelink channel state information-reference signal resource index (SL-CRI), and the one or more beams in the set of beams are associated with the one or more beam indexes based on their corresponding SL-CRIs.

7. The apparatus of claim 6, wherein each of the one or more beam indexes is associated with a different SL-CRI that corresponds to one beam in the set of beams.

8. The apparatus of claim 6, wherein each of the one or more beam indexes is associated with multiple SL-CRIs that correspond to multiple beams in the set of beams.

9. The apparatus of claim 5, wherein the at least one processor is further configured to:
   transmit information indicating the one or more beam indexes in sidelink control information (SCI), wherein one of the first subset of beams or the second subset of beams indicated in the received grant is based on the transmitted information indicating the one or more beam indexes in SCI.

10. The apparatus of claim 9, wherein the transmitted information in the SCI further indicates one or more additional beam indexes associated with one or more beams used for transmitting channel state information reference signal (CSI-RS), and the one of the first subset of beams or the second subset of beams indicated in the received grant is further based on the transmitted information indicating the one or more additional beam indexes.

11. The apparatus of claim 1, wherein the at least one processor is further configured to:
   transmit, to one or more UEs, a request to measure interference between the first UE and the one or more UEs;
   receive, from the one or more UEs based on the transmitted request, one or more interference measurements; and
   transmit, to the base station, information indicating interference measurements of the one or more interference measurements that exceed an interference threshold, wherein the information indicating the at least one of the first subset of beams of the set of beams for which the grant does not apply or the second subset of beams of the set of beams for which the grant applies with the constrained transmission power is based on the interference measurements that exceed the interference threshold.

12. The apparatus of claim 11, wherein the request is transmitted in sidelink (SL) control information (SCI), the first UE receives the one or more interference measurements from the one or more UEs in an SL medium access control (MAC) control element (CE) (MAC-CE), and the first UE transmits the interference measurements that exceed the interference threshold to the base station in at least one of a MAC-CE or radio control resource (RRC) signaling.

13. The apparatus of claim 11, wherein the interference threshold is configured by the base station.

14. The apparatus of claim 1, wherein the at least one processor is further configured to:
   transmit, to the base station, uplink (UL) sounding reference signal (SRS) for a cross-link interference (CLI) measurement, wherein the information indicating the at least one of the first subset of beams of the set of beams for which the grant does not apply or the second subset of beams of the set of beams for which the grant applies with the constrained transmission power is based on the transmitted UL SRS for the CLI measurement.

15. The apparatus of claim 1, wherein the information indicates the second subset of beams of the set of beams for which the grant applies with the constrained transmission power, and the PSSCH is transmitted through at least one beam of the second subset of beams with the constrained transmission power based on the received grant.

16. The apparatus of claim 1, wherein the at least one processor is further configured to:
receive a configuration configuring an amount of transmission power to be constrained via at least one of a system information block (SIB), radio resource control (RRC) signaling, or a medium access control-control element (MAC-CE).

17. The apparatus of claim 1, wherein the grant includes a time stamp indicating a starting time at which the first UE is to apply the information indicating the at least one of the first subset of beams of the set of beams for which the grant does not apply or the second subset of beams of the set of beams for which the grant applies with the constrained transmission power.

18. The apparatus of claim 17, wherein the at least one processor is further configured to:
reduce the first UE's transmission power for one or more beams of the at least one beam of the first subset of beams or the second subset of beams by a back-off amount when the first UE rotates by an angle greater than an angle threshold after the starting time.

19. The apparatus of claim 18, wherein the back-off amount and the angle threshold are received by the base station via at least one of a system information block (SIB), radio resource control (RRC) signaling, or a medium access control (MAC) control element (CE) (MAC-CE).

20. The apparatus of claim 1, wherein the information indicating the at least one of the first subset of beams of the set of beams for which the grant does not apply or the second subset of beams of the set of beams for which the grant applies with a constrained transmission power comprises information indicating one or more zone identifications (IDs) or one or more UE IDs associated with transmit directions for which the grant applies.

21. The apparatus of claim 1, wherein the first subset of beams corresponds to a first subset of transmit directions of a set of transmit directions, and the second subset of beams corresponds to a second subset of transmit directions of the set of transmit directions.

22. A method of wireless communication at a first user equipment (UE), comprising:
receiving, from a base station, a grant for time-frequency resources for transmitting to a second UE, the grant including information indicating at least one of a first subset of beams of a set of beams for which the grant does not apply or a second subset of beams of the set of beams for which the grant applies with a constrained transmission power; and
transmitting, to the second UE, a physical sidelink shared channel (PSSCH) through at least one beam in the set of beams excluding the first subset of beams based on the received grant, or through at least one beam of the second subset of beams with the constrained transmission power based on the received grant.

23. An apparatus for wireless communication at a base station (BS), comprising:
a memory; and
at least one processor coupled to the memory and configured to:
determine, based on transmit directions by a first user equipment (UE) that reduce an interference to other UEs, one of a first subset of beams of a set of beams that does not apply for a grant or a second subset of beams of the set of beams with a constrained transmission power for the grant; and
transmit, to the first UE based on the determination, the grant for time-frequency resources for transmitting to a second UE, the grant including information indicating the determined at least one of the first subset of beams of the set of beams for which the grant does not apply or the second subset of beams of the set of beams for which the grant applies with a constrained transmission power.

24. The apparatus of claim 23, wherein the information indicates the first subset of beams of the set of beams for which the grant does not apply.

25. The apparatus of claim 24, wherein the information specifies a third subset of beams for which the grant applies, the first subset of beams including beams in the set of beams excluding the third subset of beams.

26. The apparatus of claim 23, wherein the grant is one of a dynamic grant (DG) or a configured grant (CG).

27. The apparatus of claim 23, wherein the at least one processor is further configured to:
transmit a beam index configuration to the first UE in at least of one of radio resource control (RRC) signaling or a medium access control-control element (MAC-CE),
wherein the beam index configuration associates one or more beams in the set of beams with one or more beam indexes, and wherein the information indicating the at least one of the first subset of beams of the set of beams for which the grant does not apply or the second subset of beams of the set of beams for which the grant applies with the constrained transmission power is based on the one or more beam indexes.

28. The apparatus of claim 23, wherein the at least one processor is further configured to:
receive, from the first UE, information indicating one or more interference measurements between the first UE and one or more UEs that exceed an interference threshold, wherein the information indicating the at least one of the first subset of beams of the set of beams for which the grant does not apply or the second subset of beams of the set of beams for which the grant applies with the constrained transmission power is based on the one or more interference measurements that exceed the interference threshold.

29. The apparatus of claim 23, wherein the at least one processor is further configured to:
receive, from the first UE, uplink (UL) sounding reference signal (SRS) for a cross-link interference (CLI) measurement, wherein the information indicating the at least one of the first subset of beams of the set of beams for which the grant does not apply or the second subset of beams of the set of beams for which the grant applies with the constrained transmission power is based on the received UL SRS for the CLI measurement.

30. A method of wireless communication at a base station (BS), comprising:
determining, based on transmit directions by a first user equipment (UE) that reduce an interference to other UEs, one of a first subset of beams of a set of beams that does not apply for a grant or a second subset of beams of the set of beams with a constrained transmission power for the grant; and
transmitting, to the first UE based on the determination, the grant for time-frequency resources for transmitting to a second UE, the grant including information indicating the determined at least one of the first subset of beams of the set of beams for which the grant does not apply or the second subset of beams of the set of beams for which the grant applies with a constrained transmission power.

\* \* \* \* \*